(12) United States Patent
Narold et al.

(10) Patent No.: US 8,251,613 B2
(45) Date of Patent: Aug. 28, 2012

(54) PIPELINE LAYING VESSEL AND METHOD OF LAYING A PIPELINE

(75) Inventors: Robert Reinder Narold, Hoofddorp (NL); Cornelis van Zandwijk, Waddinxveen (NL); Coen Maarten Spanjers, 'S Gravenhage (NL)

(73) Assignee: Heerema Marine Contractors Nederland B.V., Leiden (NL)

( * ) Notice: Subject to any disclaimer, the term of this patent is extended or adjusted under 35 U.S.C. 154(b) by 225 days.

(21) Appl. No.: 12/594,065

(22) PCT Filed: Apr. 2, 2008

(86) PCT No.: PCT/NL2008/000097
§ 371 (c)(1),
(2), (4) Date: Sep. 30, 2009

(87) PCT Pub. No.: WO2008/120977
PCT Pub. Date: Oct. 9, 2008

(65) Prior Publication Data
US 2010/0111612 A1    May 6, 2010

Related U.S. Application Data

(60) Provisional application No. 60/907,416, filed on Apr. 2, 2007.

(51) Int. Cl.
*F16L 1/19*    (2006.01)
*F16L 1/20*    (2006.01)
*F16L 1/23*    (2006.01)

(52) U.S. Cl. ............. 405/168.4; 405/170; 405/166
(58) Field of Classification Search ............ 405/158, 405/166, 168.1, 168.2, 168.3, 168.4, 169, 405/170
See application file for complete search history.

(56) References Cited

U.S. PATENT DOCUMENTS

| | | | | |
|---|---|---|---|---|
| 3,680,322 | A * | 8/1972 | Nolan et al. ............. | 405/166 |
| 4,721,410 | A * | 1/1988 | Recalde ............... | 405/168.3 |
| 6,524,030 | B1 * | 2/2003 | Giovannini et al. ....... | 405/166 |
| 6,588,981 | B2 * | 7/2003 | Willis et al. ............ | 405/168.1 |
| 6,702,519 | B2 * | 3/2004 | Stockstill .............. | 405/168.3 |
| 6,733,208 | B2 * | 5/2004 | Stockstill .............. | 405/166 |
| 7,189,028 | B1 * | 3/2007 | Signaroldi et al. ......... | 405/166 |
| 7,955,028 | B2 * | 6/2011 | Roodenburg et al. ....... | 405/166 |
| 2002/0021942 | A1 * | 2/2002 | Willis et al. ............ | 405/166 |
| 2003/0091395 | A1 * | 5/2003 | Stockstill .............. | 405/166 |
| 2003/0219313 | A1 * | 11/2003 | Giovannini et al. ....... | 405/166 |
| 2005/0036842 | A1 * | 2/2005 | Stockstill .............. | 405/168.3 |
| 2006/0188341 | A1 * | 8/2006 | Stockstill .............. | 405/168.3 |
| 2007/0258772 | A1 * | 11/2007 | Bursaux et al. .......... | 405/166 |

FOREIGN PATENT DOCUMENTS

| | | |
|---|---|---|
| WO | WO2004068012 A2 | 8/2004 |
| WO | WO2006085739 A1 | 8/2006 |
| WO | WO2007000609 A2 | 1/2007 |

* cited by examiner

*Primary Examiner* — Frederick L Lagman
(74) *Attorney, Agent, or Firm* — Hoffmann & Baron, LLP

(57) ABSTRACT

The invention relates to a pipeline laying vessel (1) for laying a pipeline (2) at a seabed (3) and comprising a tower (4) comprising a firing line (5) along which in use the pipeline is laid and at least one work station (6) for connecting a pipe section (7) to a suspended pipeline and a method of laying pipeline at a sea bed with such a pipe laying vessel.

139 Claims, 25 Drawing Sheets

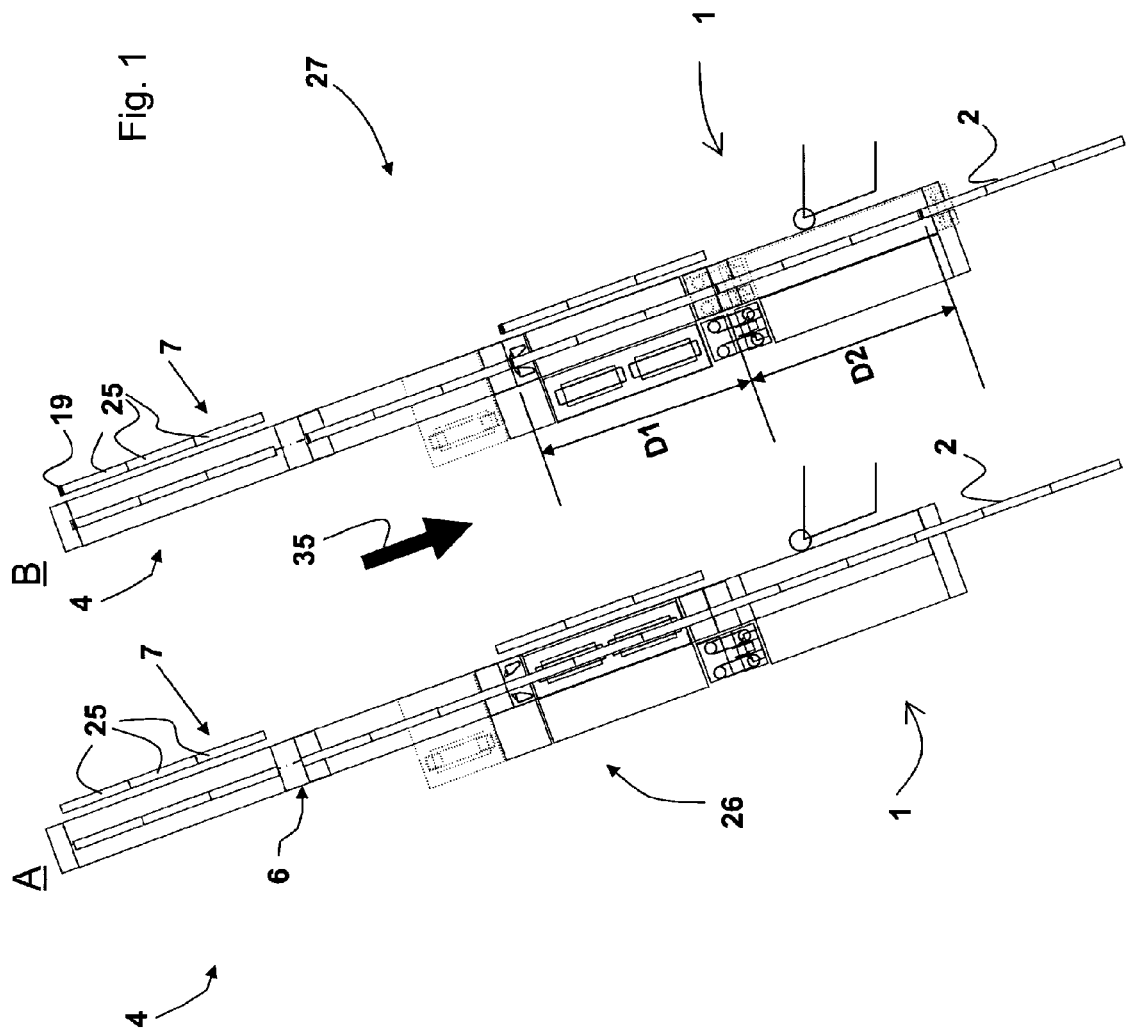

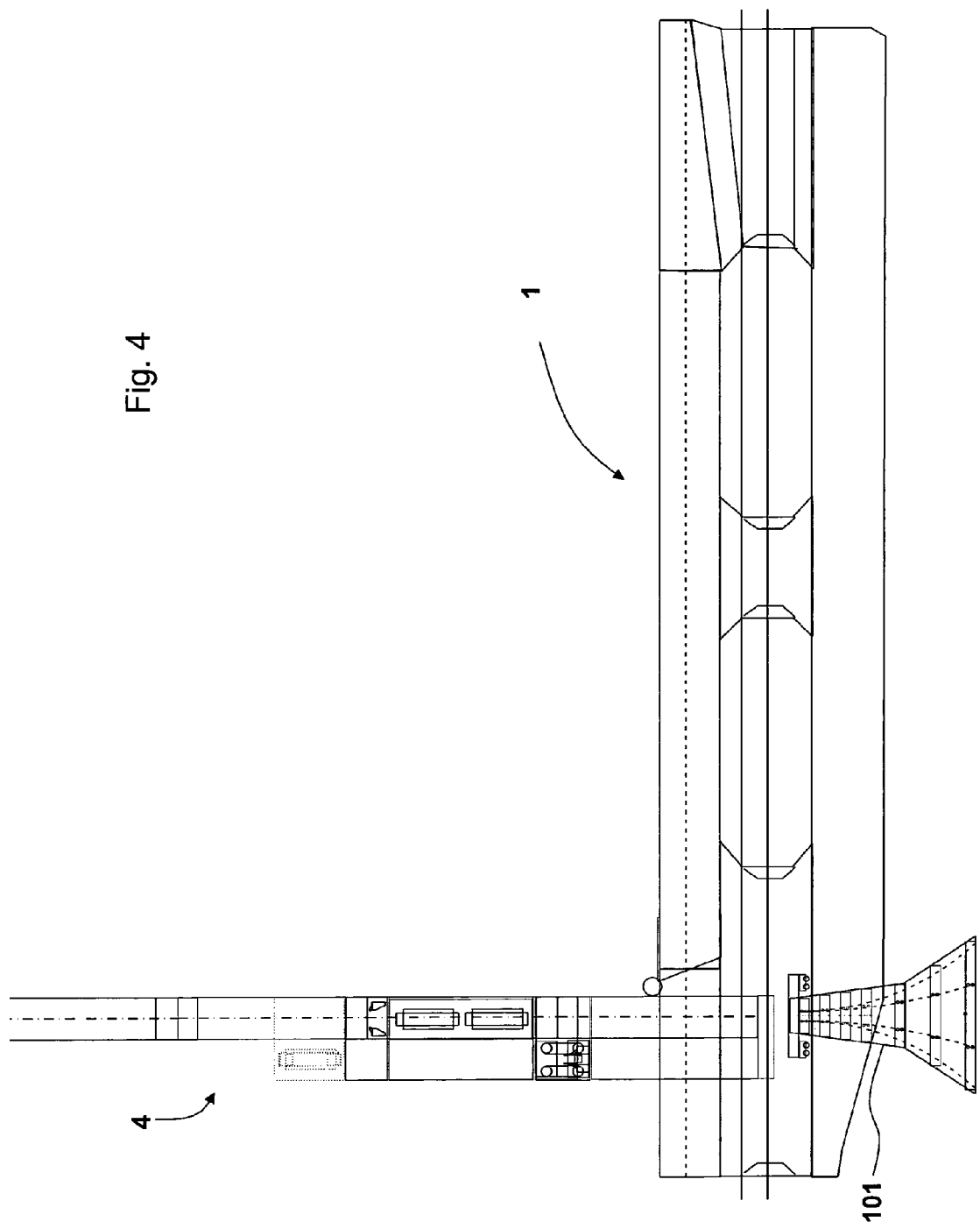

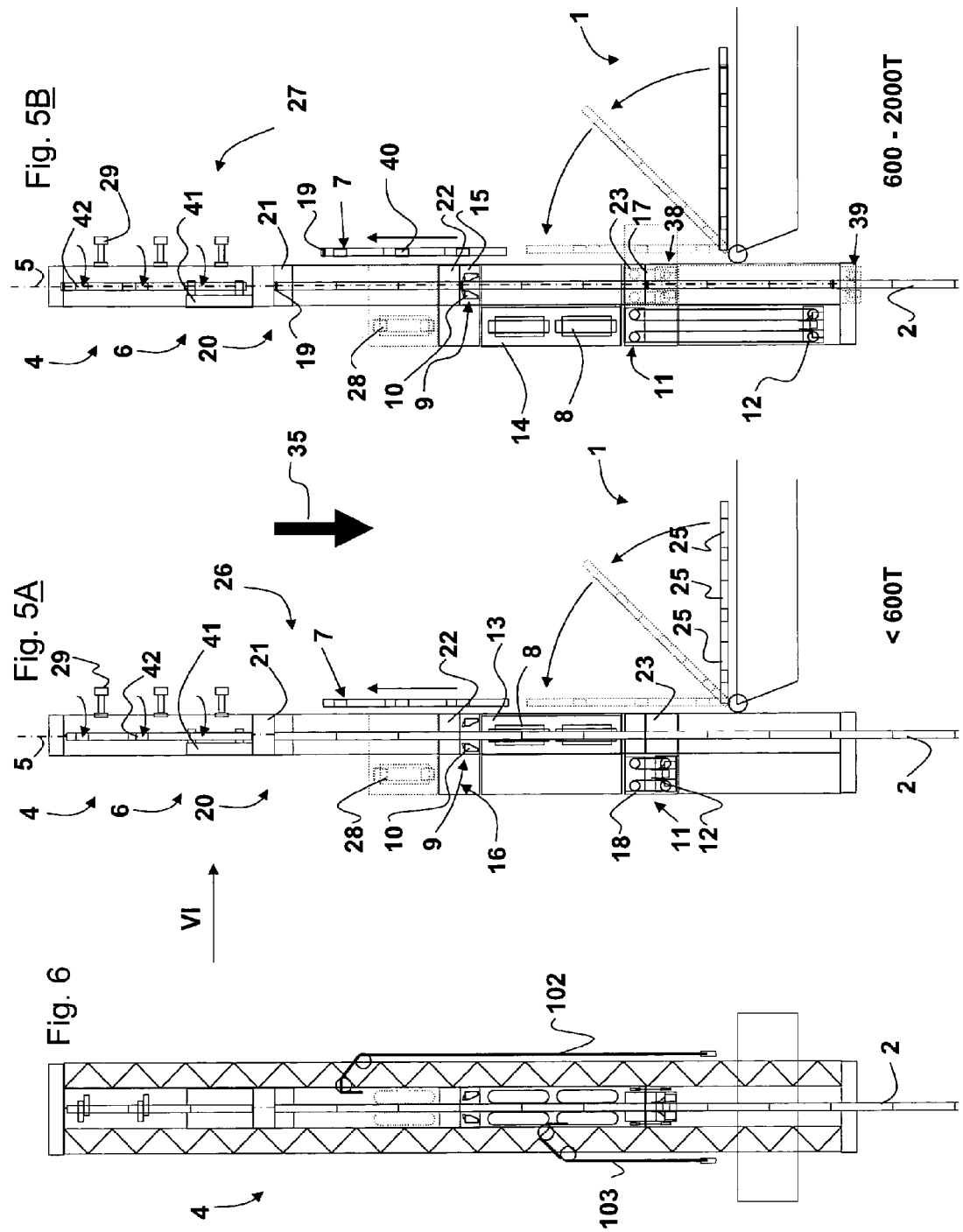

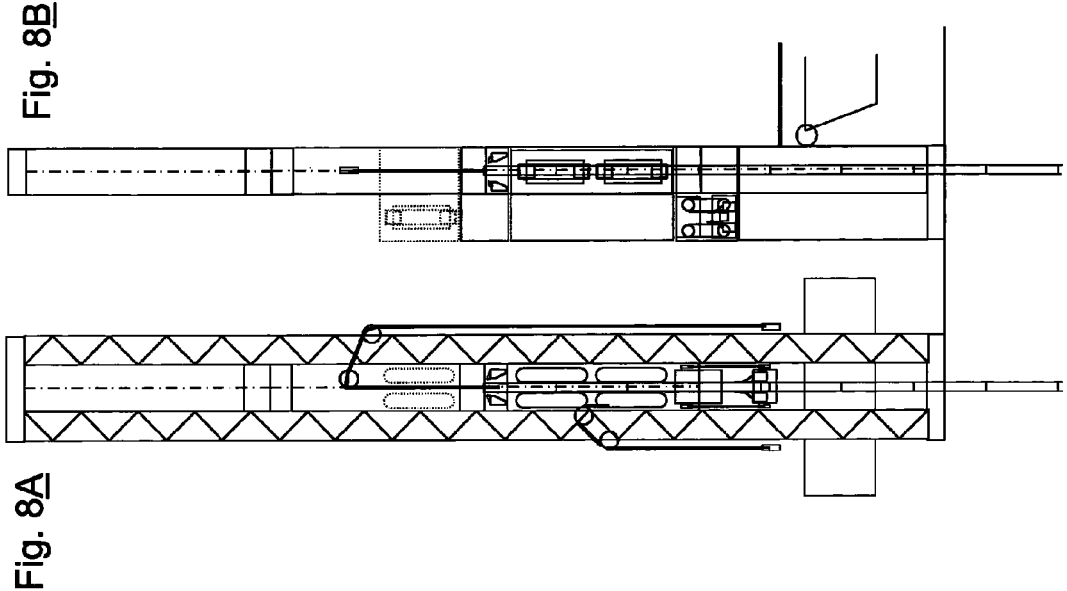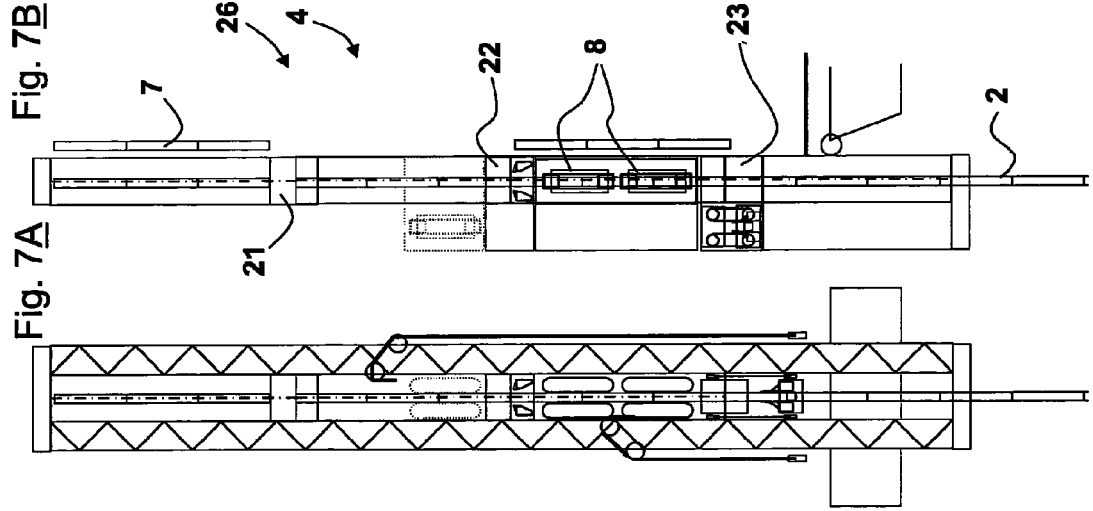

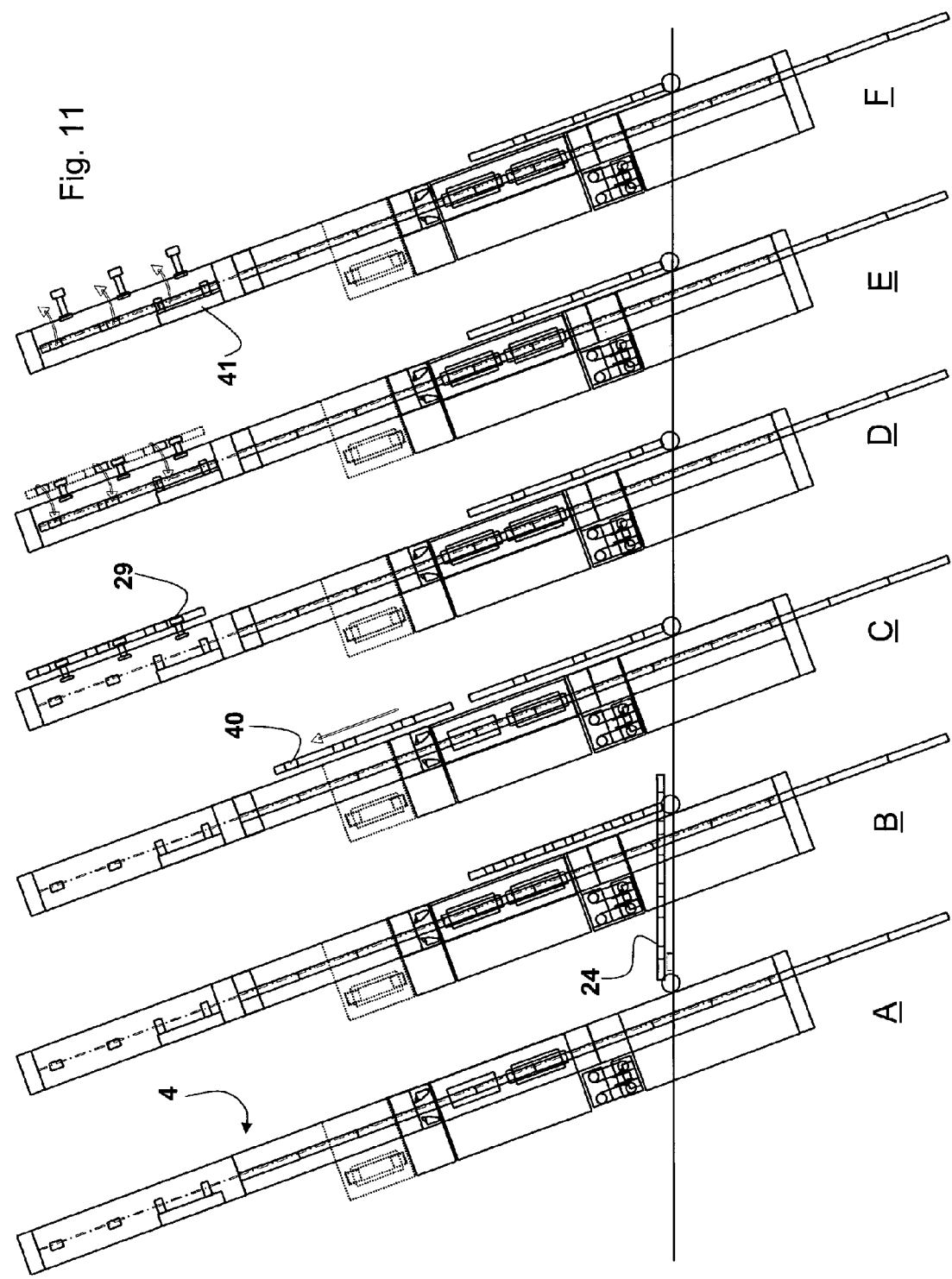

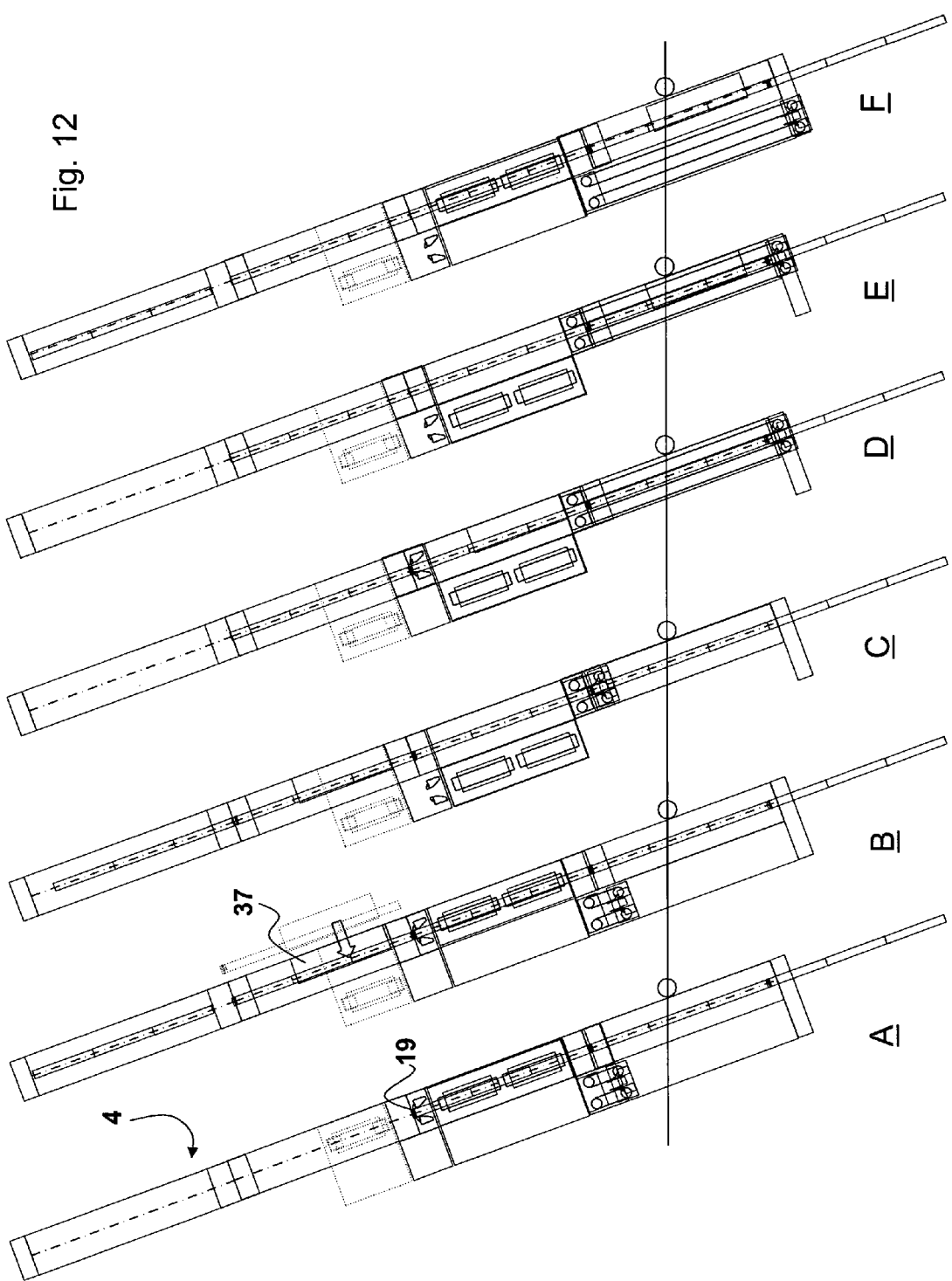

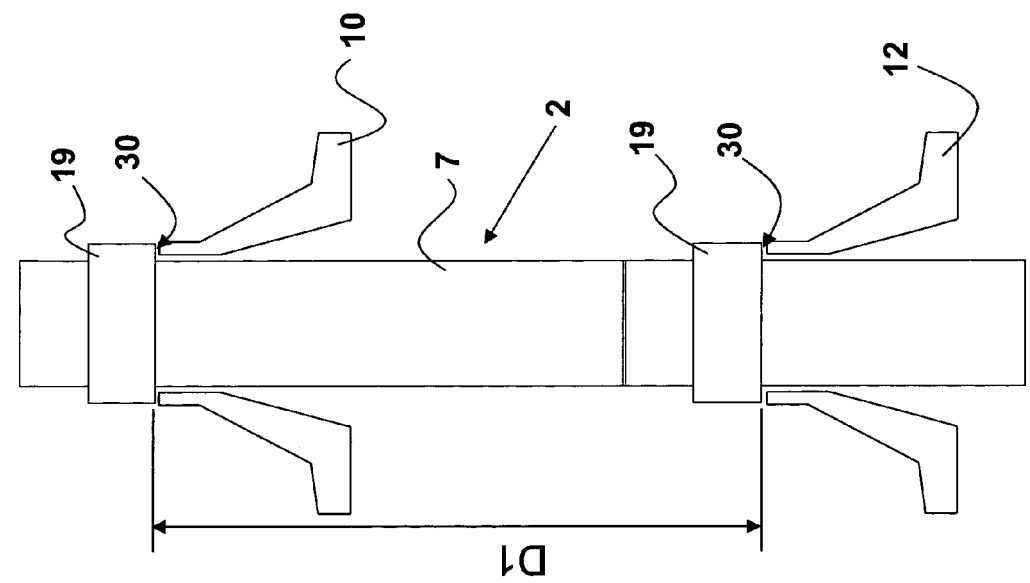
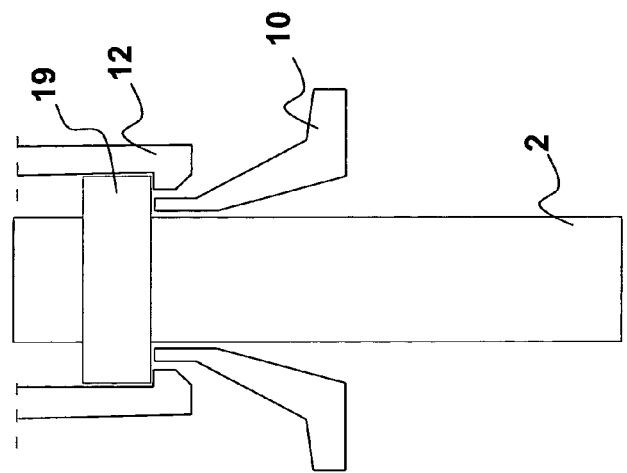

PIPELINE LAYING VESSEL AND METHOD OF LAYING A PIPELINE

CROSS-REFERENCE TO RELATED APPLICATIONS

This application is the National Stage of International Application No. PCT/NL2008/000097, filed Apr. 2, 2008, which claims the benefit of U.S. Provisional Application No. 60/907,416, filed Apr. 2, 2007, the contents of which is incorporated by reference herein.

FIELD OF THE INVENTION

This invention relates to a pipeline laying vessel for laying a pipeline at a seabed and comprising a tower comprising a firing line along which in use the pipeline is laid and at least one work station for connecting a pipe section to a suspended pipeline and a method of laying a pipeline at a sea bed with such a pipe laying vessel.

SUMMARY OF THE INVENTION

The tower may comprise at least one tensioner for fixating and lowering the pipeline. The tower may instead or in addition comprise fixating means for fixating the pipeline, which fixating means comprise a fixating clamp, and lowering means for fixating and lowering the pipeline, which lowering means comprise a lowering clamp.

The at least one tensioner, fixating means and lowering means may be arranged such that the vessel is changeable between a first configuration for laying the pipeline with the at least one tensioner and a second configuration for laying the pipeline with the fixating means and lowering means.

The use of the at least one tensioner has its own specific advantages. One of said advantages is that smooth pipe sections can be used for the laying of the pipeline. This means that it is not required that suspension means are provided on the pipe sections. Said suspension means are generally forgings, like collars, provided on the pipe sections. Said forgings are expensive, which means that the costs for the laying of pipeline are significantly reduced when using the at least one tensioners. Furthermore, with the at least one tensioner the pipeline can be laid faster.

The use of the fixating means and lowering means has its own specific advantages. One of said advantages is that said procedure is more secure, especially when a relative heavy pipeline is being laid. The at least one tensioner fixate and lower the pipeline by make use of the friction between the tensioners and the pipeline. With the fixation of the pipeline by the tensioners, there is always the (small) risk that the pipeline slips away. Because of the fixating means and lowering means use a clamp, said slipping away of the pipeline is prevented.

Further, to generate the required amount of friction when laying heavy pipes, one or more very large tensioners will be required, gripping the pipe over a large length. The at least one tensioner is preferably located below a work station (preferably suitable for welding) in a pipelay tower. To accommodate such large tensioner(s) in a pipelay tower would lead to a high and heavy construction. Fixating and lowering means are able to transfer the forces from the pipeline to the vessel over a much shorter height. The use of fixating and lowering means is therefore preferred for heavy pipelines.

The possibility to change between the abovementioned first and second configuration ensures that one can adjust the way of the laying of the pipeline (with the at least one tensioner or with the fixating means and lowering means) to the specific circumstances which arise during pipelaying. This means that it is possible to choose the most suitable way of pipelaying.

The at least one tensioners, fixating means and lowering means may be configured such that with the fixating means and the lowering means a pipeline with a higher mass is layable than with the at least one tensioner. The at least one tensioner may be configured to fixate and lower a mass of lower than 600.000 kg and the fixating means and lowering means are configured to fixate and lower a mass of higher than 600.000 kg. The fixating means and lowering means may be configured to fixate and lower a mass of between 600.000-2.000.000 kg.

The at least one tensioner may be displaceable between a tensioning position in which the at least one tensioner is engageable on the pipeline and a non-tensioning position in which the at least one tensioner is not engageable on the pipeline and a clearance is provided for the passing of a voluminous item.

The fixating means may be displaceable between a fixating position in which said fixating means is engageable on the pipeline and a non-fixating position in which the fixating means is not engageable on the pipeline and a clearance is provided for the passing of a voluminous item.

The lowering means may be displaceable between a lowering position in which the lowering means is engageable on the pipeline and a non-lowering position in which the lowering means is not engageable on the pipeline and a clearance is provided for the passing of a voluminous item.

The at least one workstation may be partly or completely displaceable between a working position in which work is performable from the workstation and a non-working position in which work is not performable from the workstation and a clearance is provided for the passing of a voluminous item.

The voluminous item may be an in-line structure and/or a PLET and/or a flex joint and/or a VIV strake and/or a buoy and/or the like.

At least part of the voluminous item comprises a width which is larger than the width of the pipeline laid by the vessel. Said width is measured substantially perpendicular to the longitudinal axis of the voluminous item or pipeline. The voluminous item may relatively be heavier than the pipeline.

The invention further relates to a method for laying a pipeline on a sea bed with a pipeline laying vessel according to the invention.

The method according to the invention may comprise the step of:
changing between a first configuration in which the pipeline is laid with the at least tensioner and a second configuration in which the pipeline is laid with the fixating means and lowering means.

The method may comprise the step of laying the pipeline with the tensioners or with the fixating means and lowering means, fixating the pipeline with the fixating means, changing to laying the pipeline with the fixating means and lowering means or with the tensioners respectively.

The method may comprise the steps of changing between a first configuration of the tower wherein the fixating means is located in the fixating position and does not engage on the pipeline or the fixating means is located in the non-fixating position, the lowering means is located in the non-lowering position, the at least one tensioner is located in the tensioning position and engage on the pipeline, and a second configuration of the tower wherein the fixating means and the lowering means are located in the fixating position and the fixating means and/or the lowering means engage on the pipeline, the at least one tensioner is located in the non-tensioning position.

The method may comprise the step wherein in the first configuration the pipeline is laid with the at least one tensioner and in the second configuration the pipeline is laid with the fixating means and lowering means. During a change between the first and second configuration the pipeline may be fixated with the fixating means. During the laying of the pipeline with the fixating and lowering means a pipeline with a higher mass may be laid than during the laying of the pipeline with the at least one tensioner.

For the addition of a voluminous item to the pipeline, the fixating and lowering of the pipeline may be taken over from the at least one tensioner by the fixating means and lowering means. After the addition of an voluminous item to the pipeline, the fixating and lowering of the pipeline may be taken over from the at least one tensioner by the fixating means and lowering means for the addition of a small number of pipe sections to the pipeline.

During the laying of the pipeline with the at least one tensioner a mass of lower than 600.000 kg may be fixated and lowered by said at least one tensioner and during the laying of the pipeline with the fixating means and lowering means a mass of higher than 600.000 kg may be fixated and lowered by said fixating means and lowering means.

During the laying of the pipeline with the fixating means and lowering means a mass of between the 600.000-2.000.000 kg may be fixated and lowered by said fixating means and lowering means.

The fixating means and the lowering means may engage on suspension means provided on the pipeline. Said suspension means may comprise a collar.

In the description some embodiments of the invention are disclosed. The embodiments are for example only, and do not in any way limit de requested scope of protection for the vessels and methods according the invention.

The invention also relates to a vessel or a method comprising a feature disclosed in the description, drawings and claims alone or in combination with one or more of any other feature disclosed in the description, drawings and claims.

A hang off clamp is a specific type of fixating clamp. Where a hang off clamp is used, also any other type of fixating clamp may be used.

The description also summarizes the outline design of a J-Lay Tower (an other type of pipe construction ramp may also be used) with combined firing line using tensioners and/or collars for a Construction and Pipe Lay Vessel (CPLV).

The tower may use tensioners for smooth pipelines with light to moderate top tensions (600 or 900 T). When the pipe is provided with appurtenances like a voluminous item (like in-line structures, PLET or flex-joints), or when the top tension is between 600 (900) and 2000T, the pipe may be suspended on collars, using two clamps for lowering the pipe.

BRIEF DESCRIPTION OF THE DRAWINGS

The invention is further explained in detail with reference to the enclosed figures, wherein:

FIG. 4 shows a side view of the vessel of FIG. 1 comprising a V-lay stinger, FIG. 5A shows a side view of the vessel of FIG. 1 during pipelaying below 600 T, FIG. 5B shows a side view of the vessel of FIG. 1 during pipelaying above 600 T, FIG. 6 show a front view of the vessel of FIG. 1, FIG. 7A shows a front view of the vessel of FIG. 1 during pipelaying below 600 T, FIG. 7B shows a side view of the vessel of FIG. 1 during pipelaying below 600 T, FIG. 8A shows a front view of the vessel of FIG. 1 during abandonment and recovery (A&R) operation for a load below 600 T, FIG. 8B shows a side view of the vessel of FIG. 1 during A&R operation for a load below 600 T, FIG. 11A-F shows a pipe construction procedure of the vessel of FIG. 1, FIG. 12A-F shows an installation procedure of the vessel of FIG. 1 for an ILS, FIG. 20 shows a side view of the fixating means and lowering means of the Balder, FIG. 21 shows a side view of the fixating means and lowering means of the vessel of FIG. 1, FIG. 22-24 show further side views of the vessel of FIG. 1.

DETAILED DESCRIPTION OF PREFERRED EMBODIMENTS

Figure 1:
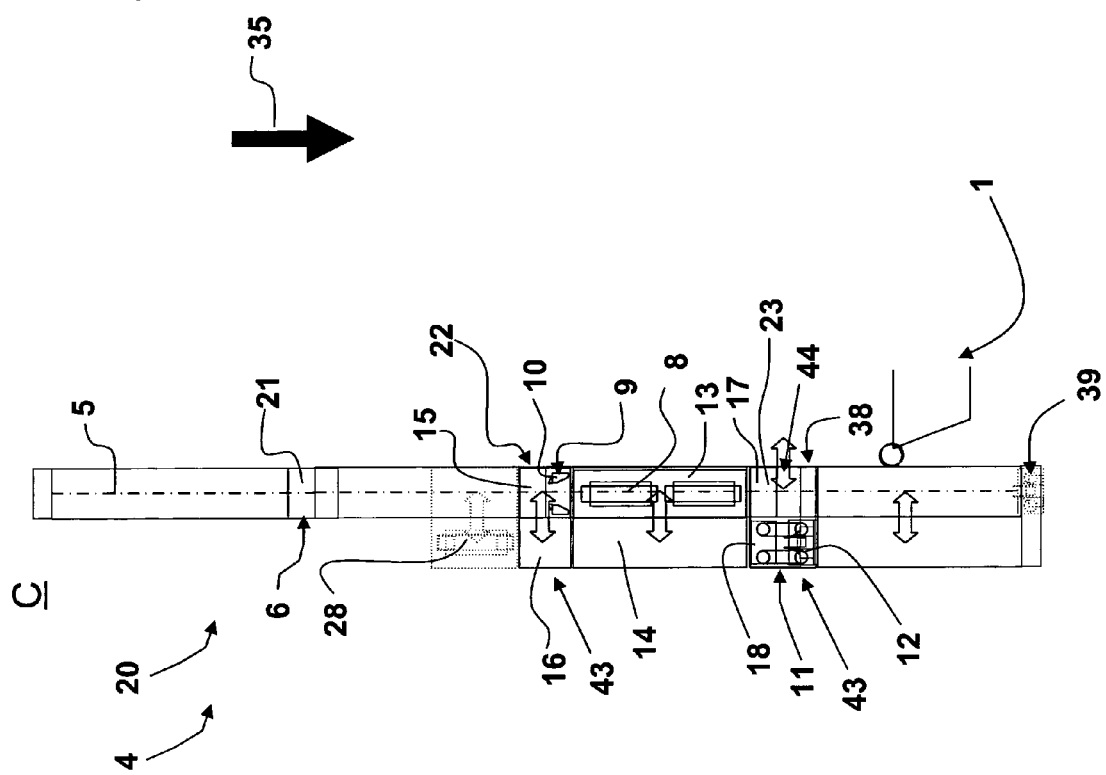
FIG. 1A-C shows a side view of an embodiment of a pipelaying vessel according the invention.

FIG. 1A-C shows a pipelaying vessel according the invention. Said vessel comprises a J-lay tower comprising a combined firing line. A J-Lay concept is developed with a combined firing line, the firing line combining the use of tensioners and the use of fixating means comprising a fixating clamp and lowering means comprising a lowering clamp. The tensioners may be used on smooth pipe up to top tensions of 600 T and the fixating and lowering means may be used (preferably in combination with collars provided on the pipeline) for heavy pipe with top tensions between 600 and 2000 T and for the installation of in-line structures, PLETs, flexjoints, etc.

The shown pipeline laying vessel 1 for laying a pipeline 2 at a seabed 3 comprises a tower 4, which tower 4 comprises a firing line 5 along which in use the pipeline 2 is laid and at least one work station 6 for connecting a pipe section 7 to the pipeline 2. The tower 4 comprises tensioners 8 for fixating and lowering the pipeline 2. The tower 4 also comprises fixating means 9 for fixating the pipeline 2, which fixating means 9 comprise a fixating clamp 10, and lowering means 11 for fixating and lowering the pipeline 2, which lowering means 11 comprise a lowering clamp 12. The lowering clamp may be mounted on a travelling block in order to be able to lower pipeline 2 by travelling between an upper position 38 and a lower position 39. The tensioners 8, fixating means 9 and lowering means 11 are arranged such that the vessel 1 is able to in use change between a first configuration 26 (see FIG. 1A) in which the pipeline 2 is laid with the tensioners 8 and a second configuration 27 (see FIG. 1B) in which the pipeline 2 is laid with the fixating means 9 and lowering means 11.

The tensioners 8 are displaceable between a tensioning position 13 in which the tensioners 8 are engagable on the pipeline 2 and a non-tensioning position 14 in which the tensioners 8 allow passing of the pipeline 2 past the tensioners 8. The tensioners 8 are in the non-tensioning position 14 located at a greater distance from the firing line 5 than in the tensioning position 13. The tensioners 8 in the tensioning position 13 surround the firing line 5 and are in the non-tensioning position 14 positioned such that the tensioners 8 do not surround the firing line 5. The tensioners 8 are displaceable such that in the non-tensioning position 14 the tensioners 8 allow passing of an in line structure and/or a PLET and/or a flex joint and/or a VIV strake and/or the like past the tensioners. The tensioners 8 are displaceable in a direction substantially perpendicular to the firing line. The tensioners 8 are displaceable in one specific direction. The tensioners 8 may be at least displaceable between the three and eight m, preferably approximately six m, from the firing line 5. The tensioners 8 may be at most displaceable between the six and twelve m, preferably approximately eight m, from the firing line. Additional tensioners 28 may be provided in order to allow heavier pipes (up to for example 900T) to be laid with tensioners if sufficient room is available. The tensioners 8, 28 may be displaceable independently from each other.

The fixating means 9 are displaceable between a fixating position 15 in which the fixating clamp 10 is engageable on the pipeline 2 and a non-fixating position 16 in which the fixating means 9 allow passing of the pipeline 2 past the fixating means 9. The fixating means 9 are in the non-fixating position 16 located at a greater distance from the firing line 5 than in the fixating position 15. The fixating clamp 10 in the fixating position 15 surrounds the firing line 5 and is in the non-fixating position 16 positioned such that the fixating clamp 10 does not surround the firing line 5. The fixating means 9 are displaceable such that in the non-fixating position 16 the fixating means 9 allow passing of an in line structure and/or a PLET and/or a flex joint and/or a VIV strake and/or the like. The fixating means 9 are displaceable in a direction substantially perpendicular to the firing line 5. The fixing means 9 may be at least displaceable between the three and eight m, preferably approximately six m, from the firing line 5. The fixing means 9 may be at most displaceable between the six and twelve m, preferably approximately 8 m, from the firing line.

The lowering means 11 are displaceable between a lowering position 17 in which the lowering clamp 12 is engageable on the pipeline 2 and a non-lowering position 18 in which the lowering means 11 allow passing of the pipeline 2 past the lowering means 11. The lowering means 11 are in the non-lowering position 18 located at a greater distance from the firing line 5 than in the lowering position 17. The lowering clamp 12 in the lowering position 17 surrounds the firing line 5 and is in the non-lowering position 18 positioned such that the lowering clamp 12 does not surround the firing line 5. The lowering means 11 is displaceable such that in the non-lowering position 17 the lowering means 11 allow passing of an in line structure and/or a PLET and/or a flex joint and/or a VIV strake and/or the like past the lowering means 11. The lowering means 11 is displaceable in a direction substantially perpendicular to the firing line 5. The lowering means 11 may be at least displaceable between the three and eight m, preferably approximately six m, from the firing line 5. The lowering means 11 may be at most displaceable between the six and twelve m, preferably approximately eight m, from the firing line 5.

The tower 4 may comprise more than one work stations. The work stations may be substantially aligned along the firing line. The work stations may be located at a distance (D) from each other.

The tower comprises an upper work station 21, a middle work station 22 and a lower work station 23. The upper work station is located at a distance D1 from the middle work station.

The lower work station 23 is located at a distance D1 from the middle work station 22. The distance D1 is substantially equal to the length of the pipe section 7 from which the pipeline 2 is constructed. The distance D1 may be substantially equal to twice the length of the pipe section 7 from which the pipeline 2 is constructed. The pipe section 7 has the length of a triple joint. The distance D1 is substantially equal to 37 m. The upper work station 21 is configured for welding the pipeline 2, the middle work station 22 is configured for welding and/or coating the pipeline 2, and the lower work station 23 is configured for coating the pipeline and installing additional items like VIV strakes, anodes and the like on the pipeline. At least one workstation may be laterally displaceable (preferably in a direction perpendicular to the firing line 5) in order to provide room for a voluminous item (for instance an in-line structure 37, a PLET, a flexjoint or a buoyancy element) to be lowered along the firing line. Also more than one workstations may be laterally displaceable, these may be the middle working station 22 and the lower working station 23.

A voluminous item is an item which during laying because of the diameter, seen in the direction substantially perpendicular to the firing line, can not pass a work station located in the working position and/or a fixating means located in the fixating position and/or a tensioning means located in the tensioning position and/or lowering means located in the lowering position. An in-line structure is an example of a voluminous item. Where an in-line structure is mentioned, it may also be any other type of voluminous item. Some examples of a voluminous item are bulky elements like a PLET (structure which may be located at the end of the pipeline), a flexjoint (structure which also may be located at the end of the pipeline), a bulky buoyancy element and the like.

At least one work station may be releasable attached the tower 4, this may be the middle work station 22. Also all workstations may be releasable attached to the tower 4. The tower 4 may comprise only two work stations, which work stations are located at a distance D1 from each other.

The lowering means 11 are in the firing direction 35 located after the fixating means 9. The lowering means 11 are located at a distance D2 from the fixating means 9. The distance D1 is substantially equal to D2. The lowering means 11 are configured to at least lower the lowering clamp the distance D2. The distance D2 is substantially equal to the length of a pipe section 7 from which the pipeline 2 is constructed. The distance D2 is substantially equal to 37 m.

The tensioners 8, the fixating means 9 and the lowering means 12 are substantially displaceable in the same direction. The fixating clamp 10 and the lowering clamp 12 are configured to in use engage on a collar 19 provided on the pipeline 2 (see FIG. 21).

The fixating means 9 are in the fixating position 15 located in or nearby the middle work station 22. The lowering means 11 are in the lowering position 17 located in or nearby the lower work station 23. The tensioners 8 are located between the middle work station 22 and the lower work station 23. Additional tensioners 28 may be located between the upper work station 21 and the lower work station 22.

The tower 4 is arranged pivotally relative to the vessel. The tower 4 comprises a loader 29 for loading a pipe section 7. The loader 29 is located above the upper work station 21. Pipe sections are transported from the deck via an upender 24 and an elevator 40 to the loader. The loader hands over the pipe section to an external line up tool 41 or to a buffer rack in the top of the tower (not shown). Tower rollers 42 give additional stability (see FIG. 5).

Figure 2:
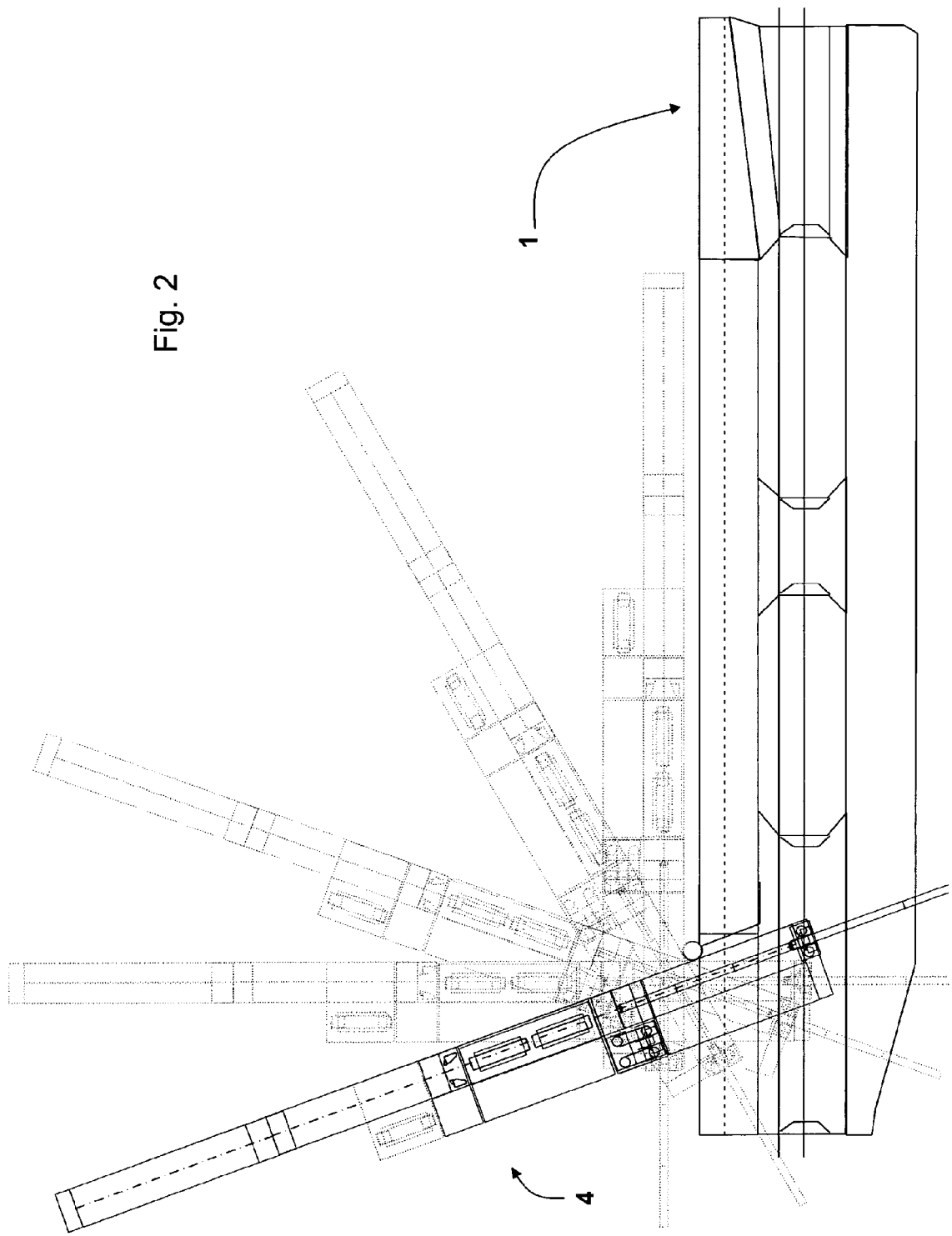
FIG. 2 shows a side view of the vessel of FIG. 1.

FIG. 2 shows the vessel of FIG. 1. The pivotal tower 4 is shown in different positions relative to the vessel 1. The J-lay tower with combined firing line has a standard tower angle between 90 and 1100 to the deck with an associated lay direction towards the stern of the vessel. With this tower angle all deepwater flowlines, SCRs and export lines can be installed, including in-line structures, PLETs, flex-joints, etc. in water depths beyond 300 to 500 m (depending on the stiffness of the pipe).

For the shallow water sections of export line to the beach with water depth shallower than 300 to 500 m, the pipe is abandoned; the vessel turned 1800; and the pipe recovered with the tower under 700. The section to the beach is laid in lay direction towards the bow of the vessel, the tower gradually decreasing to 300 when a water depth of ~50 m is reached.

Figure 3:
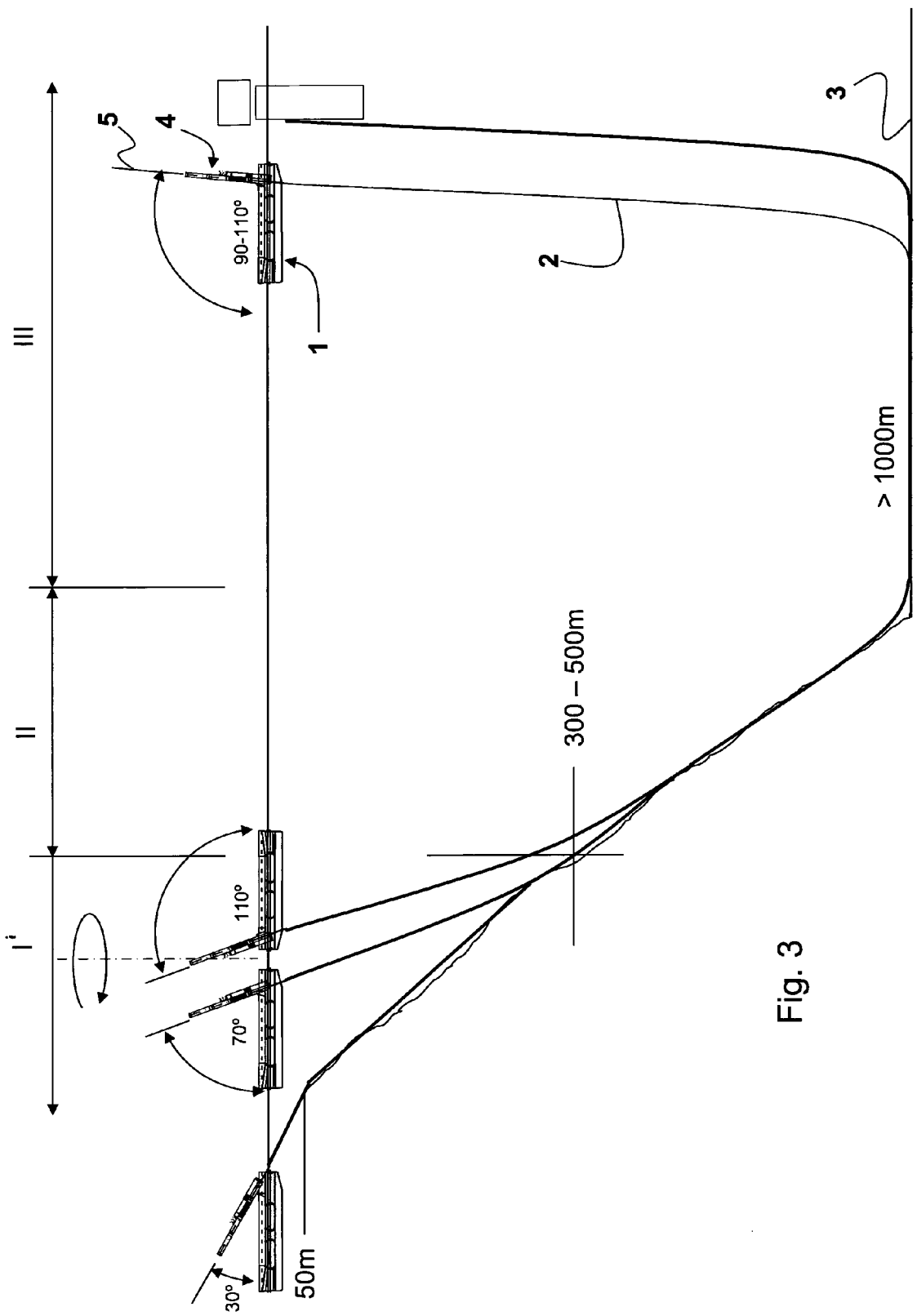
FIG. 3 shows the vessel of FIG. 1 during pipelaying.
Figures 10A, 10B:
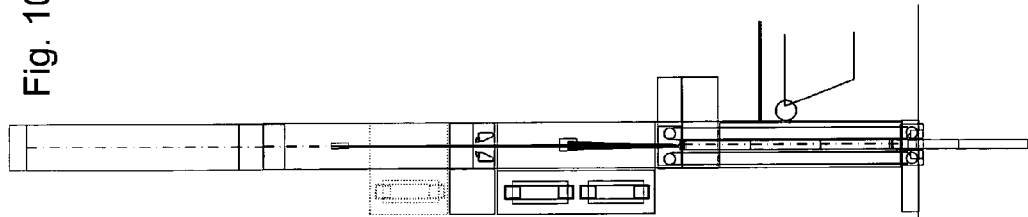
FIG. 10A shows a front view of the vessel of FIG. 1 during A&R operation for a load above 600 T.
FIG. 10B shows a side view of the vessel of FIG. 1 during A&R operation for a load above 600 T.
Figures 9A, 9B:
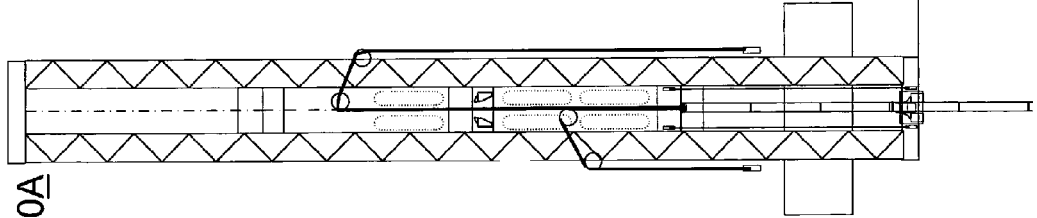
FIG. 9A shows a front view of the vessel of FIG. 1 during pipelaying above 600 T.
FIG. 9B shows a side view of the vessel of FIG. 1 during pipelaying above 600 T.

This procedure is shown in FIG. 3, wherein the tower angle versus the water depth is indicated. In FIG. 3 part III indicates the Deepwater flowlines and SCRs, part II indicates the Deepwater export lines and part I indicates the Export and trunk lines to the beach.

Further, the tower can be laid down horizontally on the deck of the vessel. The horizontal position offers advantages in: parallel activities during diameter changes, easy access during maintenance and low fatigue during transits. The possibilities for said parallel activities are increased.

The vessel may be configured such that in horizontal position the bottom end of the tower does not protrude beyond the stern. This allows keeping the tower on board during dual crane heavy lift operations with a barge on the stern. This also allows keeping the tower on board during dual crane heavy lift operations when a barge is moored on the stern.

In vertical position (tower angle 90°), the J-Lay tower is able to operate with a V-Lay stinger as shown in FIG. 4. In said FIG. 4 a V-Lay stinger 101 is attached to the hull.

The general assembly of the J-Lay tower with combined firing line is also shown in the FIGS. 5-10. When laying smooth pipe with a top tension less than 600 T, the tensioners are in the firing line. For these pipes the hang-off clamp in the middle work station and the lowering clamp below the lower work station are not used. For pipe with a top tension between 600 and 2000 T and for the installation of pipe appurtenances which can not pass through the tensioners, the tensioners are retracted from the firing line and the hang-off and lowering clamp used for handling the pipe. Pipes handled by the clamps must be provided with collars. The A&R system for operations for a load below 600 T is indicated by 102, for a load above 600 T the A&R system indicated by 103 is used. It is also possible to use both the systems 102 and 103.

Optional features of the tower concept are:
Pipeline construction process based on triple joint pipe lengths constructed in three parallel work stations,
Due attention for system times in such a way that the J-Lay process cycle time can potentially approach S-Lay standards,
Work station inventory adapted to accommodate full range of tower working angles (i.e. 110° to 30°),
A pipe feeding and loading system which is never critical with respect to the primary cycle time of line-up, welding, NDT, FJC and lowering,
An External Line-Up Tool (ELUT) with the performance (similar) of the ELUT of the deep water construction vessel Balder J-Lay Tower in combination with a pipe hung off on tensioners or hang-off clamp,
A lowering system based on tensioners for smooth pipe up to a top tension of 600 T with the following advantage: no cost of collars and associated logistics for light flowlines in a competitive market,
A lowering system based on a hang-off and a lowering clamp for more complicated and heavy pipe allows for safe and reliable execution of complicated deepwater construction work,
The lowering clamp separated at least a triple joint length from the hang-off clamp enables the use of single step collars with a small rim of ~40 mm,
The lowering clamp below the last work station has the following advantages: welding of pipe-in-pipe to be distributed over the upper two work stations; no travelling block in the way of new pipe coming from the loader,
In-line structures installed between the upper and middle work station, optionally between the middle and bottom work station (Advantages: short stem pieces installation low in the tower favourable in swell areas welding and NDT in upper two work stations, equipped for welding of pipe-in-pipe anyway),
Single wire A&R system above middle work station, capable of abandonment and recovery of the pipe from/into the tensioners,
Multi-wire A&R system above the lower work station, capable of abandonment and recovery of the pipe from/into the lowering clamp in bottom position (The single wire A&R system can possibly be combined into the multi-wire A&R system), and The lay direction towards the stern enables easy hand-over of SCRs to a floating production facility.

An optional pipe construction procedure is also shown in FIG. 11A-F.

The procedure involves the following steps:

1. An assembly of an Upender, an Elevator, a Loader and a system of tower rollers bring a new pipe section of three joints length (a triple-joint, also referred to by TJ) into the firing line for line-up.
2. The External Line-Up Tool (ELUT) performs the final landing on and line-up with the previous pipe section in the upper work station.
3. In the upper work station, the first part of the welding, inspection and coating activities is carried out. Depending on the durations of welding, NDT and FJC for the pipe under construction, the pipe construction process is distributed as equal as possible over the three work stations.
4. When the work in all three work stations is completed, the pipe is lowered over one TJ length, whereupon the entire cycle is repeated.

The following situations are shown in FIG. 11—
A: Load TJ section,
B: Upender brings TJ in line with tower,
C: Elevator brings TJ to loading zone in top of tower,
D: Loader takes TJ from elevator,
E: Loader swings TJ into firing line or buffer storage,
F: Tower rollers engaged, ELUT grips pip; Loader released.

FIG. 12 show an optional installation procedure of an in-line structure (ILS). For welding the in-line structure to the pipe, the pipe is hung off on a collar at the ILS insertion point from a hang-off table (HOT) at the middle work station.

The ILS is provided with stem pieces to make it a TJ length and brought into the firing line between the upper and middle work station. In the middle station, the ILS is welded to the pipeline; in the upper station, a next TJ is welded to the ILS.

Subsequently, the lowering clamp (LC) is moved into the firing line. As the upper block of the LC is located behind the lower work station, the lower work station is moved laterally together with the upper block and the guiding system of the LC. The LC is engaged and the weight of the pipe taken into the LC. Now the HOT, the middle work station and the tensioners are moved out of the firing line to give passage to the ILS. The pipe with the ILS is lowered over one TJ distance and the HOT engaged.

A next TJ is added in the upper station, the LC pulled up and engaged and the HOT disengaged and moved out of the firing line. The pipe is lowered again over one TJ distance by the LC. At this level, the tensioners are brought back into the firing line and engaged. The LC is disengaged and retrieved out of the firing line together with its upper block and guiding system; this brings the lower work station back into the firing line. From this point onwards normal pipelay is resumed on tensioners.

The following situations are shown in FIG. 12—
A: Collar at ILS insert point and engage HOT,
B: Load ILS and weld in upper two stations,
C: Bring LC into firing line and engage; move HOT and tensioners aside,
D: Lower LC over one TJ. Engage HOT,
E: Weld next TJ. Pull up LC and engage. Disengage HOT and lower LC one TJ, and
F: Engage tensioners. Release LC, move aside and pull up. Continue pipelay.

FIG. 13A-K shows an installation procedure for in-line structure. The procedure described is said figures requires three collars: two on the two TJs below the ILS and one on the upper stem piece of the ILS.

Figure 13:
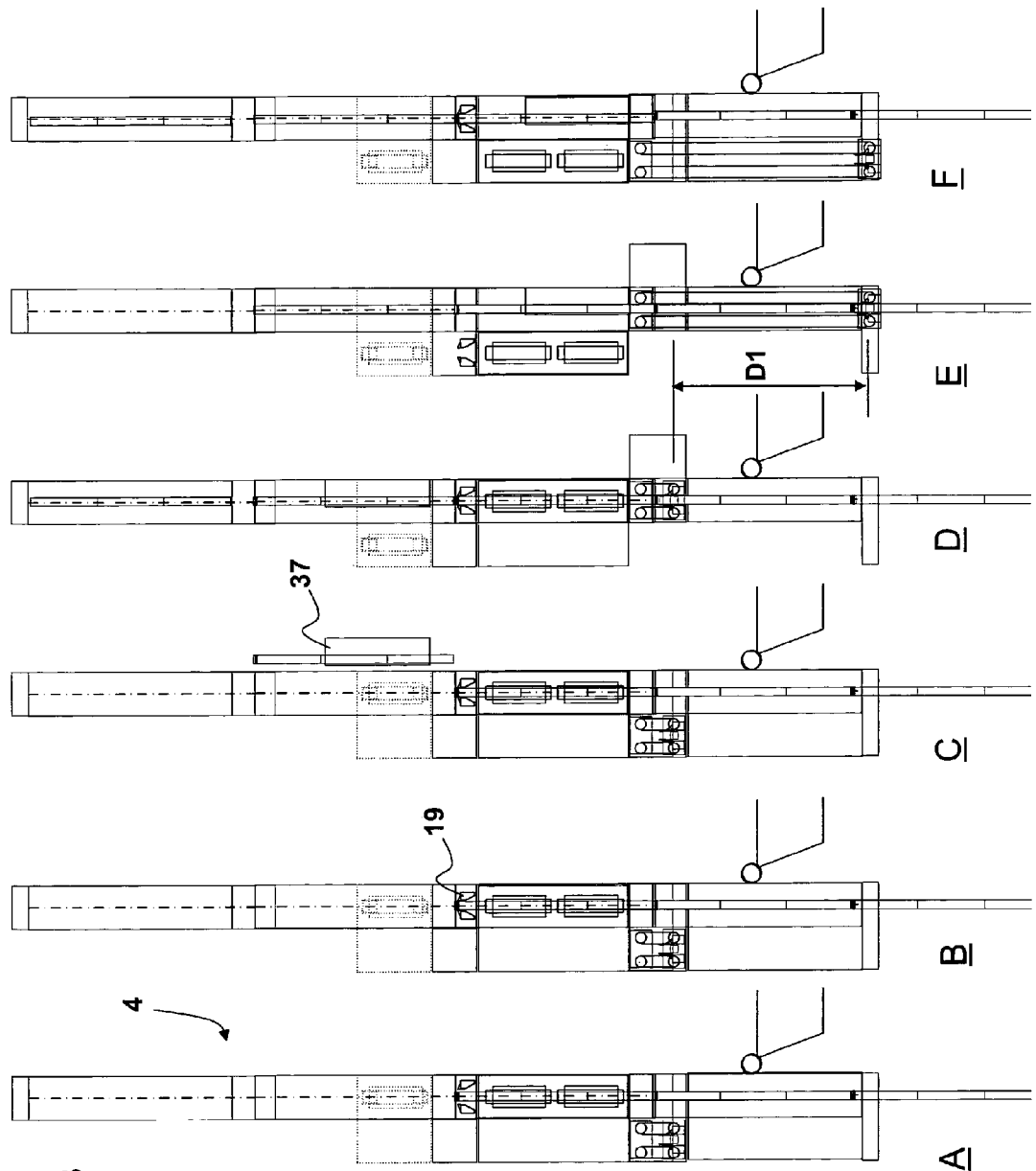
FIG. 13A-K shows an installation procedure of the vessel of FIG. 1 for an ILS.
Figure 13:
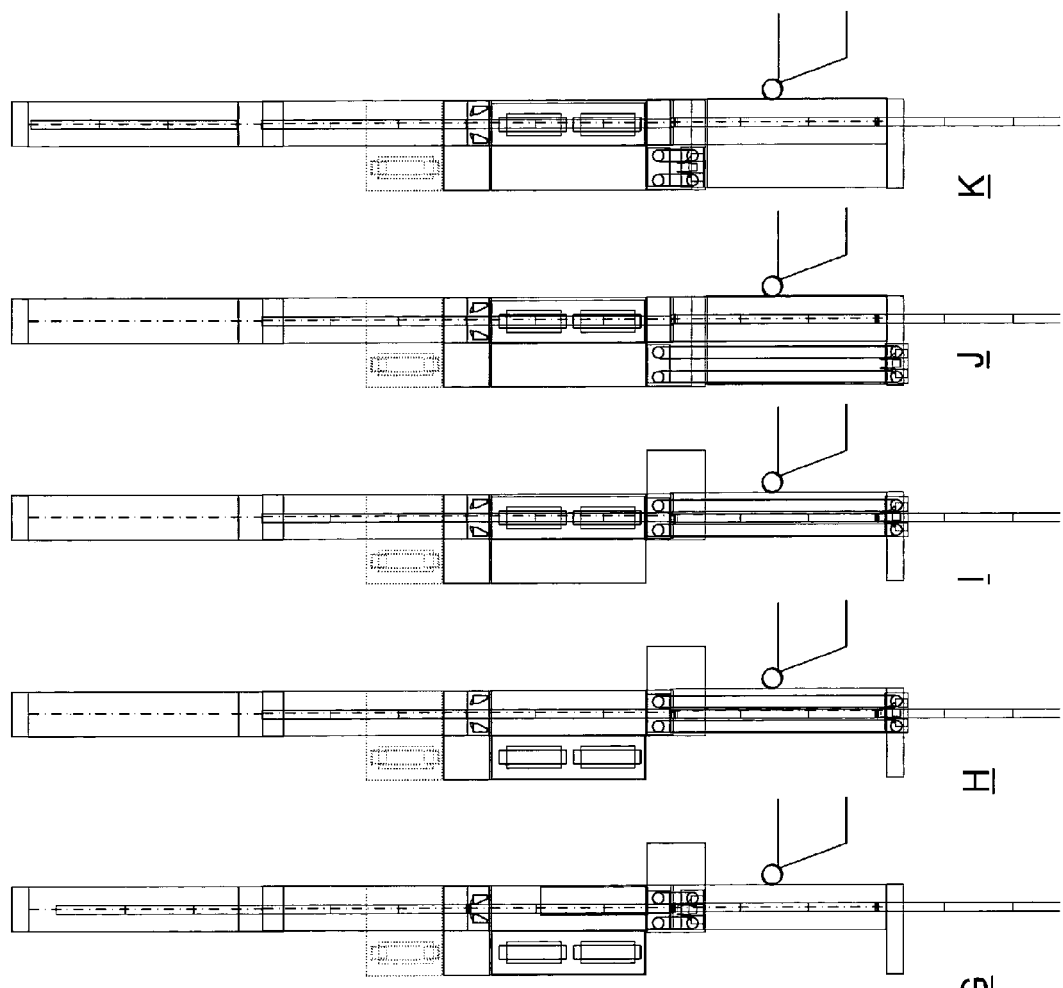

The following situations are shown in FIG. 13—
A: Step 1, Collar at ILS insert point,
B: Step 2, Engage HOT,
C: Step 3, Stab ILS,
D: Step 4 Engage LC. Weld ILS+one TJ,
E: Step 5, Move HOT+tensioners aside. Lower over one TJ,
F: Step 6, Move HOT back and engage. Add one TJ. Retrieve LC,
G: Step 7, Engage LC with collar below ILS,
H: Step 8, Open HOT and lower LC over one TJ,
I: Step 9, Return tensioners to firing line and engage,
J: Step 10, Disengage LC and bring out of firing line, and
K: Step 11, Pull up LC to parking position. Add TJ.

An alternative procedure is, to bring the ILS into the tower between the middle and lower work station. In swell areas this can be an advantage. For welding the ILS to the pipeline in the middle work station, the ILS first has to be brought upward over one TJ distance. This could be done using the single wire A&R system, provided that the A&R sheave is placed above the upper work station.

Figure 14:
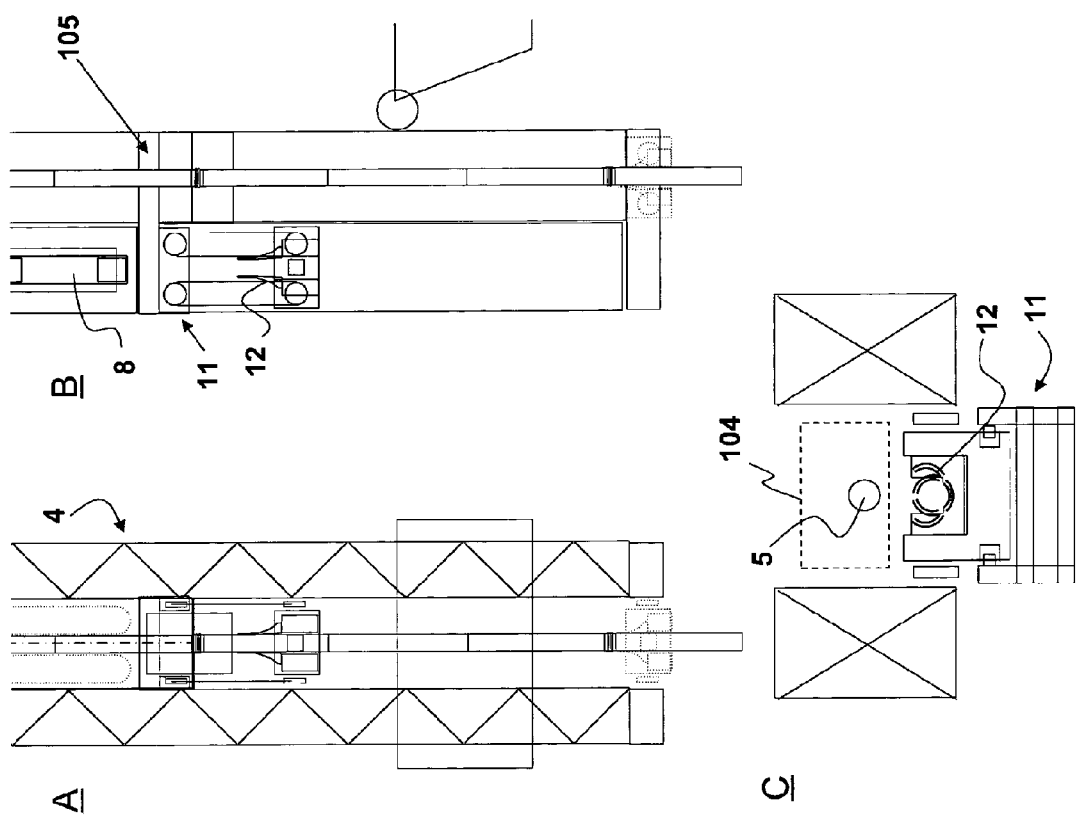
FIG. 14A shows a front view of the lowering means of the vessel of FIG. 1 in the non-lowering position.
FIG. 14B shows a side view of the lowering means of the vessel of FIG. 1 in the non-lowering position.
FIG. 14C shows a view in cross section of the lowering means of the vessel of FIG. 1 in the non-lowering position.
Figure 15:
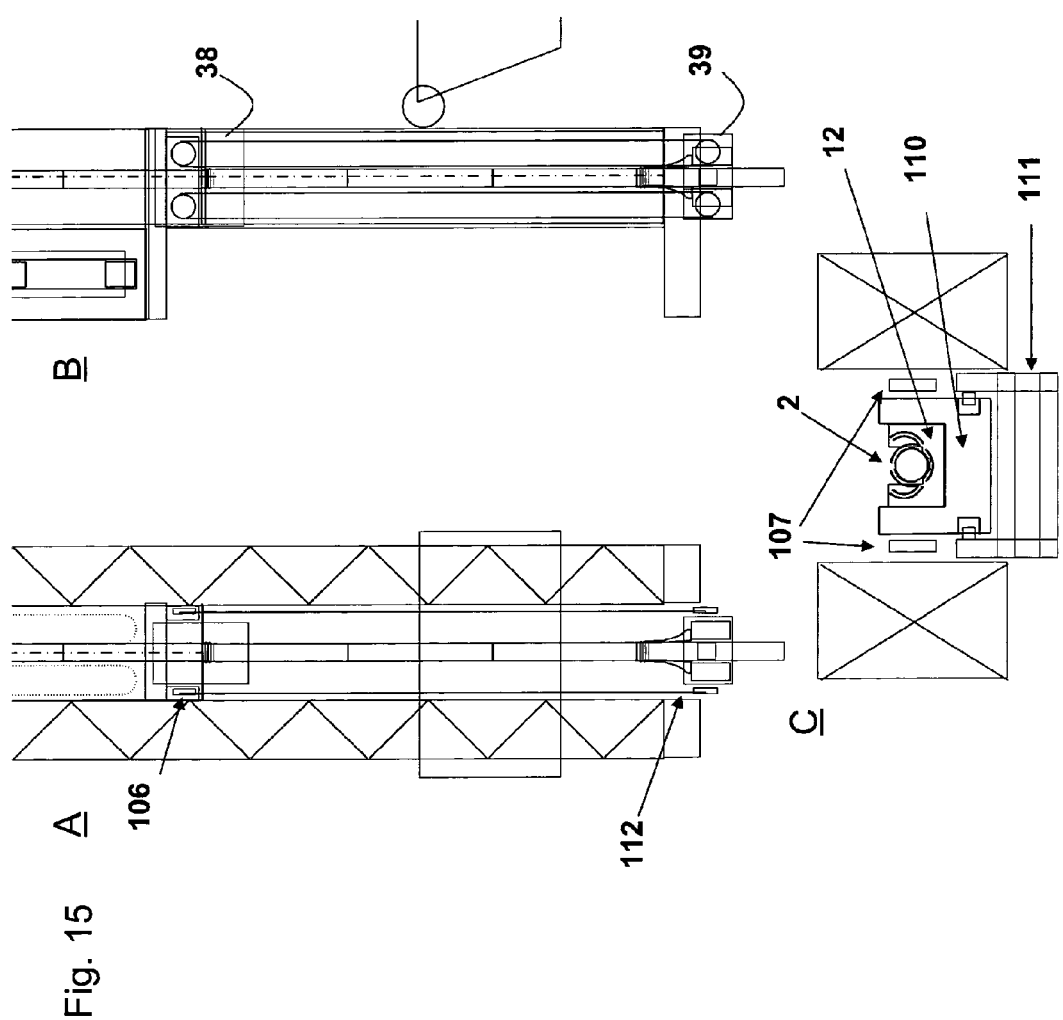
FIG. 15A shows a front view of the lowering means of the vessel of FIG. 1 in the lowering position.
FIG. 15B shows a side view of the lowering means of the vessel of FIG. 1 in the lowering position.
FIG. 15C shows a view in cross section of the lowering means of the vessel of FIG. 1 in the lowering position.

The FIGS. 14 and 15 illustrate an optional concept of the lowering clamp assembly. An upper block is suspended from a rail at the stern side of the lower work station. From this upper block a multi-wire hoisting system is suspended. The lower block is a U-shaped travel block in which a U-shaped collar clamp is mounted. The U-shape allows lateral engagement and disengagement of the clamp with a collar. The travel block is guided along a guide frame. The entire assembly of upper block, lower block and guide frame can be moved laterally into and out of the firing line.

The upper block is located at about the level of the weld to be worked on (FJC); the lower block in its storage position is located just below the level of the lower work station. The lower work station is suspended from the support beam of the suspension rail. The wire bundles of the hoisting system are kept flat and close to the port and starboard support structures of the tower. The distance between the wire bundles may be wide enough to allow an in-line structure of 6.5 m wide to pass between them. The lower work station is located between the wire bundles.

For engaging the lowering clamp, the entire clamp assembly (upper block, hoisting wires, lower block and guide frame) is moved laterally into the firing line. The collar pads of the lowering clamp are standing up over the distance from the upper side of the travel block through the floor of the lower work station up to the underside of the collar on the pipe, a distance of about 3.5 m. Once in the firing line, the lowering clamp is hoisted up to the collar and engaged.

Subsequently, the pipe is lowered over a TJ length distance. For disengagement, the lowering clamp must be laterally retracted over a distance of at least half the depth of the collar clamp plus the distance between the underside of an in-line structure and the firing line (is centre line pipe); this distance is about 3.5 to 4 m.

Figure 16:
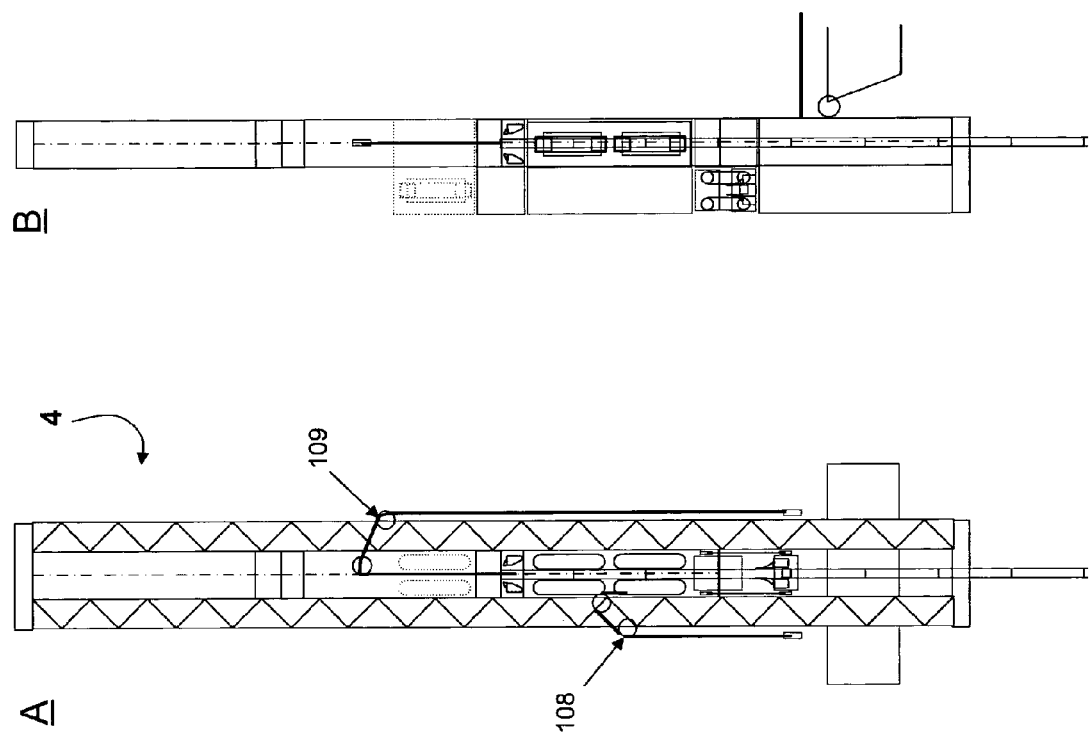
FIG. 16A shows a front view of the vessel of FIG. 1 during A&R with top tension below 600 T.
FIG. 16B shows a side view of the vessel of FIG. 1 during A&R with top tension below 600 T.
Figure 17:
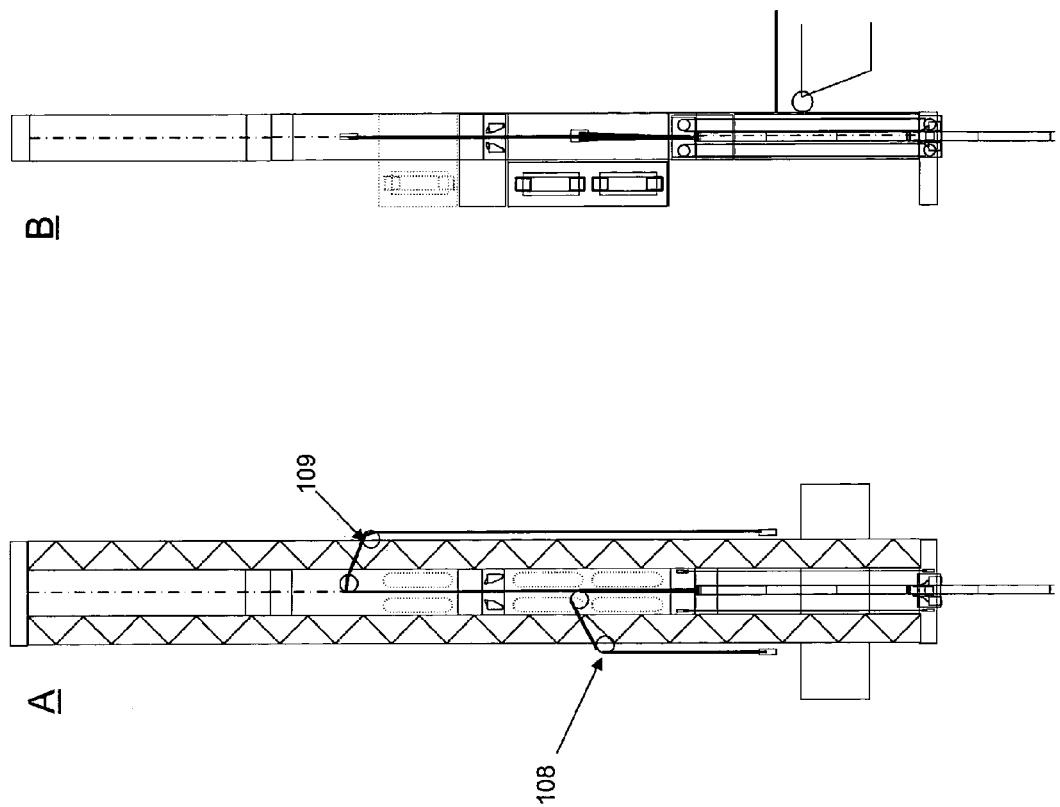
FIG. 17A shows a front view of the vessel of FIG. 1 during A&R with top tension between 600-2000 T.
FIG. 17B shows a side view of the vessel of FIG. 1 during A&R with top tension between 600-2000 T.

An optional A&R procedure is shown in the FIGS. 16 and 17. A single wire A&R system 109 of 600 T capacity is provided above the middle work station (optionally above the upper station, not shown in pictures); at this level a movable sheave can be deployed into the firing line. At this level, the single wire A&R system is capable of taking over or handing over the pipe from/to the tensioners. The A&R hook is capable to pass through the tensioners in opened position.

When intending to bring in-line structures into the tower between the lower and middle work stations (option), it could be preferred to place the A&R sheave above the upper work station. At that location, the A&R system is capable of lifting the in-line structure to a level between the upper and middle station where it can be welded into the pipe string.

A multi-wire A&R system 108 of 1400 T capacity is provided above the lower work station; at this level a set of movable sheaves can be deployed into the firing line. At this level, the multi-wire A&R system is capable of taking over or handing over the pipe from/to the lowering clamp in its bottom position.

The single A&R wire of 600 T capacity can be joined with the 1400 T multi-wire A&R system to increase the A&R capacity from 1400 to 2000 T.

The 1400 T A&R sheaves are placed below the hang-off clamp at the middle work station in order to keep the tower section under 2000 T compressive load as short as possible.

The multi-wire A&R system for 600 to 2000 T capacity may be foreseen to be a system of 3 to 4 wires in a parallel non-reeved arrangement. Due attention is to be paid to the safe operation of such a system.

A 2nd End PLET is installed and lowered on collars, like an in-line structure. The PLET is welded to the pipeline in the middle work station. Then it is lowered on collars until the PLET is below the lower work station. At that position, the A&R system is connected to the A&R head at the tail end of the 2nd End PLET.

When the top tension is below 600 T, the single A&R wire is deployed from the A&R sheave between the upper and middle work station; if the top tension is more than 600 T, the multi-wire A&R system is deployed, or a combination of the multi-wire and the single wire A&R systems.

The tower angle between 90 and 110° allows the pipe to be handed over directly from the J-Lay A&R system to the platform hauling-in system.

When a flex-joint is foreseen at the end of the riser, the flex-joint is handled and welded like a 2nd End PLET.

The following features are optional for the J-Lay tower with combined firing line.

Construction Process: Triple Joints Length and Three Parallel Work Stations

The pipe construction process may be built up from the following sub-processes:
1. Line up pipe section
2. Weld
3. Inspect weld
4. Coat field joint
5. Lower pipe over section length
6. Load new section The choice may be made for a pipe construction process based on three work stations and triple joint section lengths, under the condition that the pull time (steps 5+6) will meet S-Lay standards.

A construction ramp of three TJ lengths has the following advantages:
TJs are still a convenient section length to be hoisted on board under most environmental circumstances, and
the three TJ concept offers the advantage of a flexible middle work station, to be used for welding in combination with the upper station on pipe-in-pipe and to be used for FJC in combination with the lower work station on wet coated pipe.

Lay Rate According to S-Lay Standards

A significant difference is noted between S-Lay and J-Lay lay rates, which is purely due to the difference in pull time (i.e. loading and lowering). Looking in more detail into the J-Lay handling process, the existing concepts show a number of points where—due to the nearly vertical pipe position—the handling is slower than in S-Lay and less pipe buffer is provided in J-Lay as compared to S-lay.

It is believed that these shortcomings in J-Lay can be ironed out by proper attention in the design and construction of the handling systems.

Construction Process Independent on Tower Angle

The J-Lay tower with combined firing line may be capable of working under tower angles between 110° and 30°. This wide variation of tower angles imposes a number of requirements to the equipment and pipe construction process:

Welding stations may be adaptable to the tower angle such that the welder experiences as much as possible the same working environment independent on the angle of the tower, except that the pipe runs at a variable angle through the working station, Pipe handling systems may be suitable for directions of gravity as related to the full range of tower angles on the pipe sections handled, and The pipe tension may act under the full range of tower angles.

Figure 18:
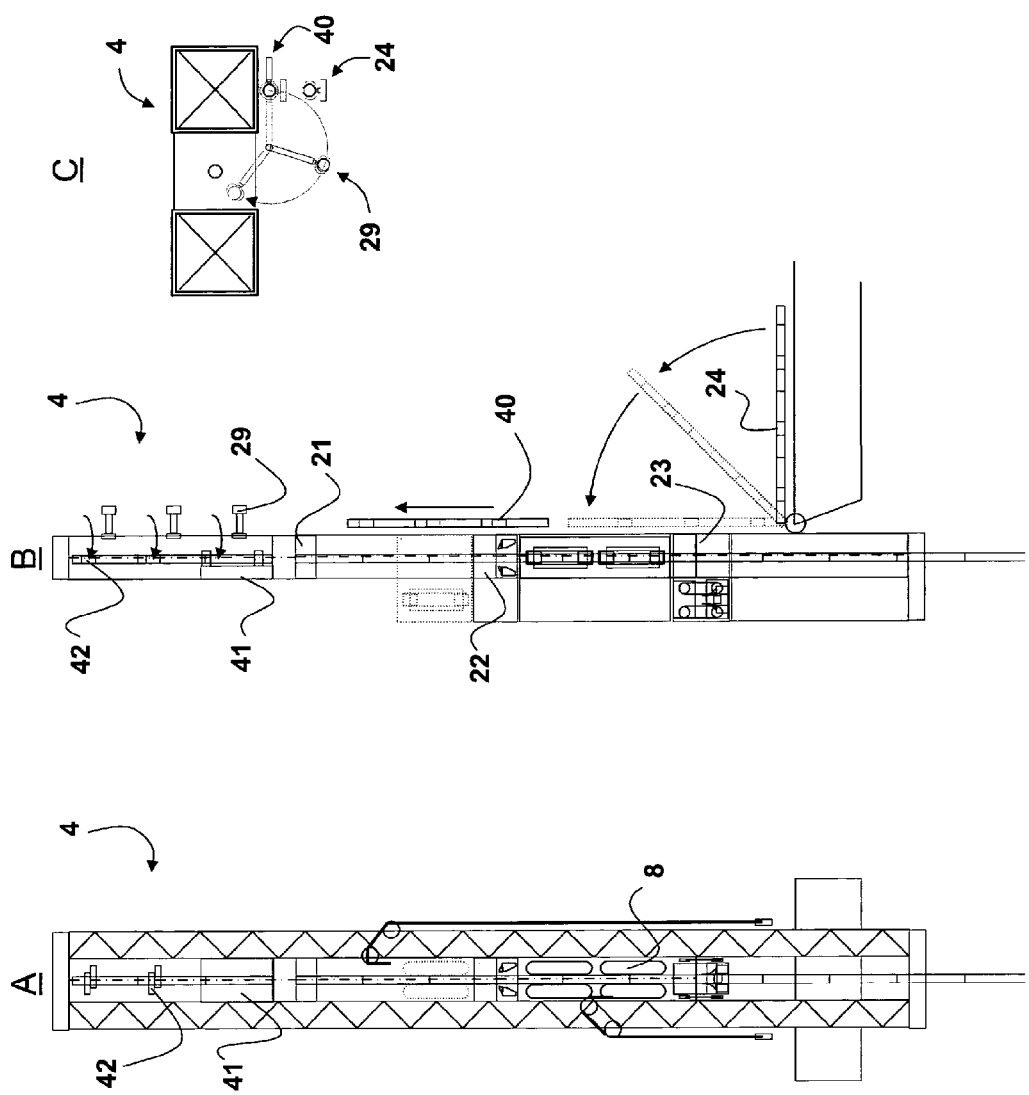
FIG. 18A shows a front view of the tower of the vessel of FIG. 1.
FIG. 18B shows a side view of the tower of the vessel of FIG. 1.
FIG. 18C shows a view in cross section of the tower of the vessel of FIG. 1.

An embodiment of the pipe feeding and loading system is shown in FIG. 18A-C and may consist of the following components: Upender 24, Elevator 40, Loader 29, (Buffer), Tower rollers and External line-up tool (ELUT) 41.

The system times of these components may be tuned such that a minimum cycle time is achieved.

Figure 19:
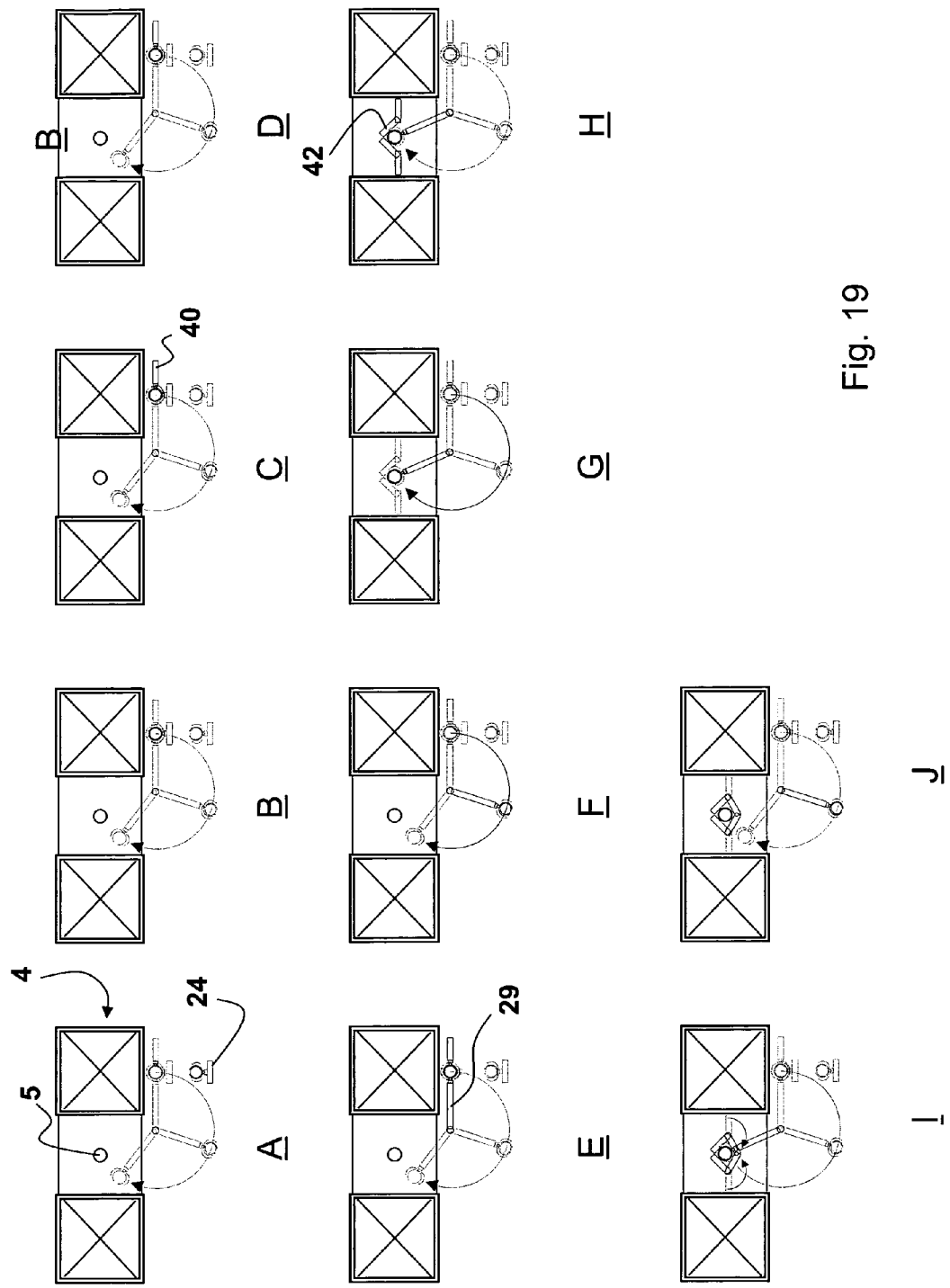
FIG. 19A-J shows a pipe feeding and loading procedure of the vessel of FIG. 1.
Figure 22:
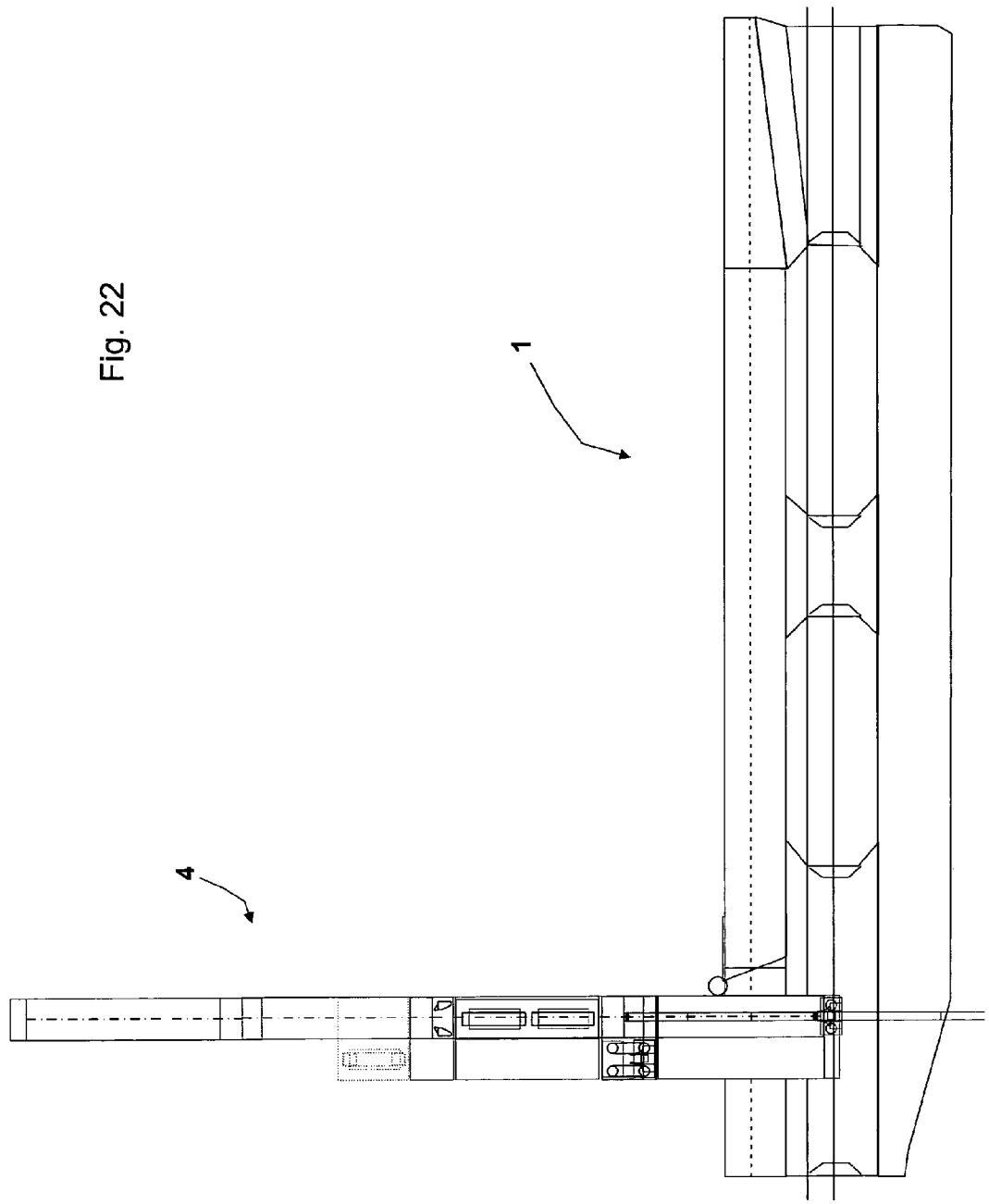
Figure 23:
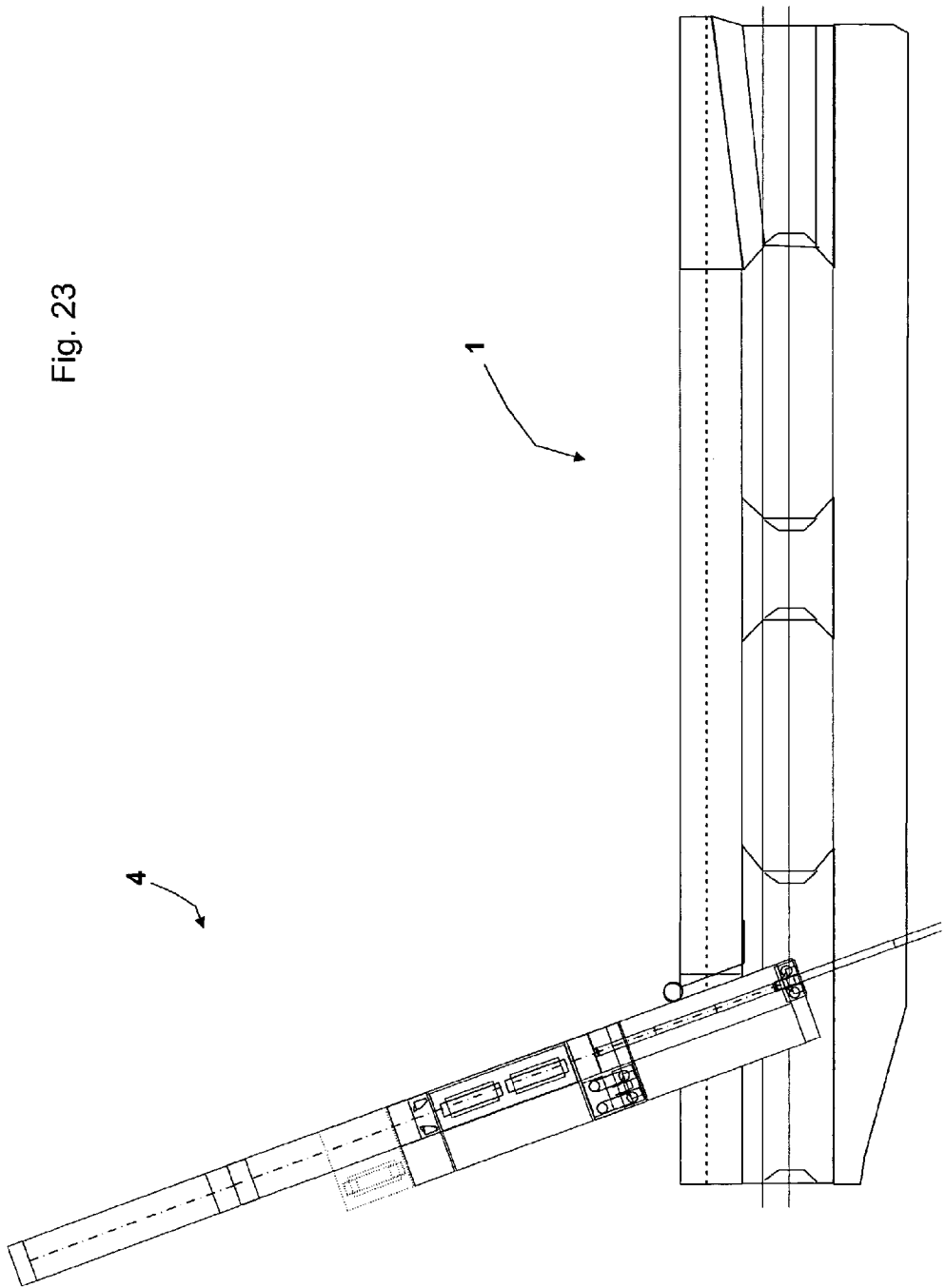
Figure 24:
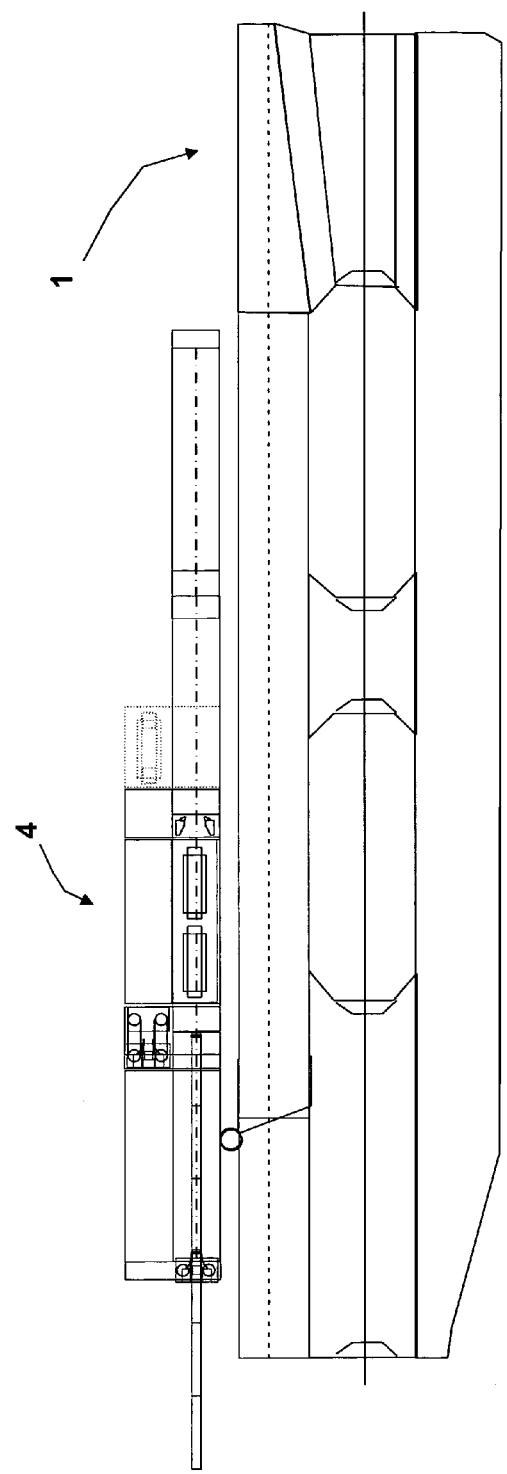
Figure 25:
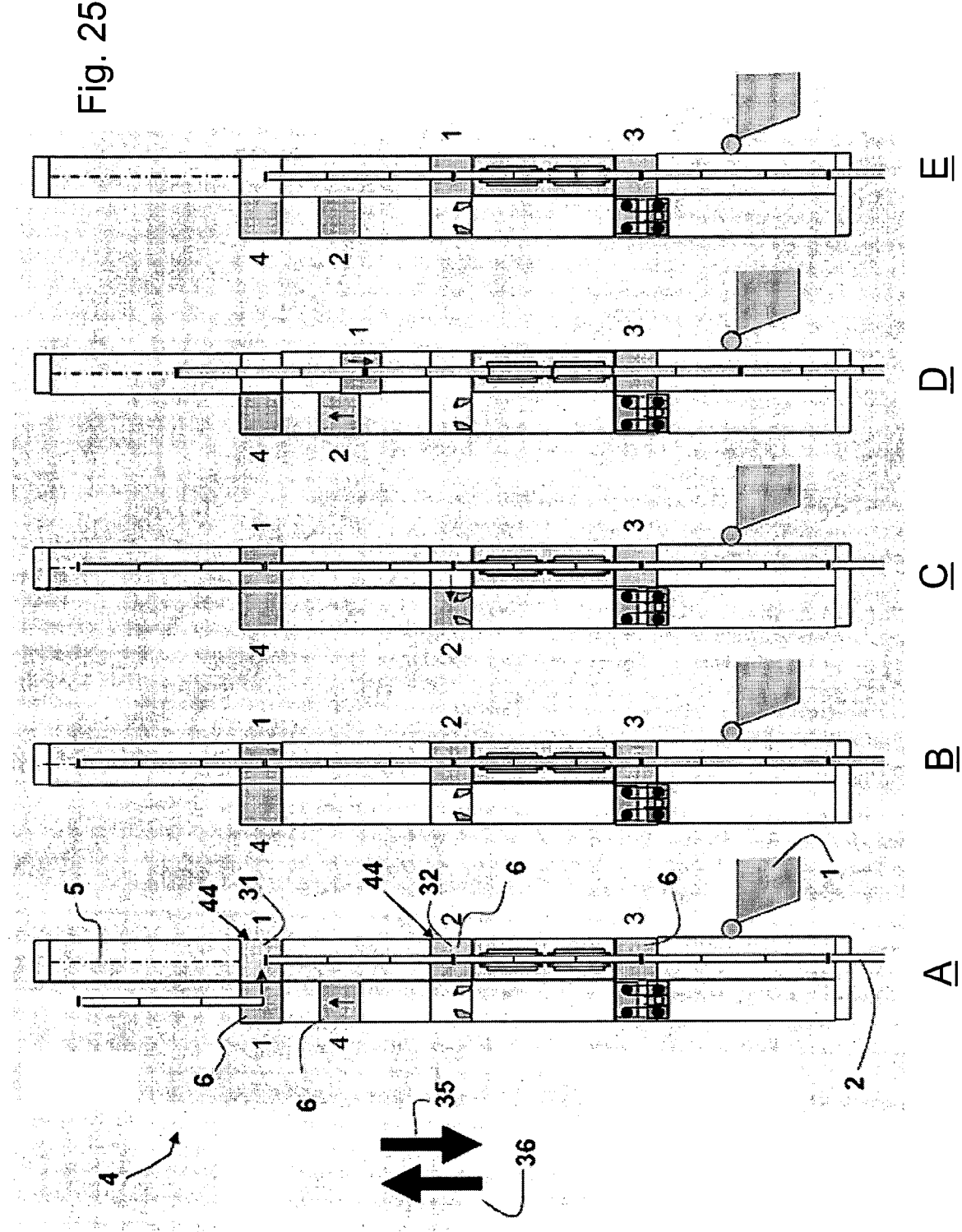
FIG. 25A-E shows a further embodiment of the vessel according the invention.

FIG. 19 show sequential steps of the pipe feeder and loader system. The following situations are shown in FIG. 19—

A: Load pipe and engage Upender clamps,
B: Raise Upender to Tower angle,
C: Engage Elevator Clamps; disengage Upender clamps,
D: Raise Elevator to top of Tower,
E: Engage Loader clamps; disengage Elevator clamps,
F: Rotate pipe into tower,
G: Bring pipe into firing line,
H: Lower pipe to weld level,
I: Engage Tower Rollers; disengage Loader clamps,
J: Rotate Loader out of Firing line.

Upender

The Upender may rotate the pipe from horizontal to vertical.

Elevator

The Elevator may raise the pipe from its upended position to the upper section of the Tower where it is taken over by the Loader.

Loader

The Loader may take the pipe from the Elevator, rotates it into the firing line and lowers the lower end of the pipe through the roof of the upper work station to the welding level.

The provision of a pipe section Buffer in the top of the Tower may make the Loader independent on the ELUT cycle.

Buffer/Auxiliary Work Positions

The application of a pipe Buffer or a number of auxiliary work positions in the top section of the Tower is recommended. The work positions may be used for bringing in an Internal Line-Up Clamp (ILUC), for pre-heating, etc.

When a Buffer is applied, the Loader function may be split into three sub-functions: a first loader function moves the pipe from the Elevator into the Buffer a buffer operator function shifts the pipe from one buffer position to another a second loader function moves the pipe from the buffer into the firing line.

Tower Rollers

The Tower Rollers may take over the lateral load of the pipe section from the Loader (the axial load may be supported by the ELUT), enabling the Loader clamps to be disengaged.

An alternative solution for eliminating the moving in and moving out activities might be to have Tower Rollers in fixed positions, the Rollers only needing to be engaged and disengaged.

ELUT

The ELUT may take over the axial load of the pipe section from the Loader and lines the pipe section up with the underlying top of pipe.

Fine Line-Up with External Line-Up Tool (ELUT)

Fine line-up of a new pipe section on to the underlying top of pipe may be done with the ELUT. Following the positive experience on the Balder, the ELUT may be of a similar design as the ELUT of the Balder J-Lay Tower.

A difference with the Balder J-Lay Tower is that in the J-Lay tower with combined firing line, pipe with a top tension below 600 T may be lowered on tensioners and not resting on a collar. As a result, the top of the pipe may not be exactly fixed with respect to the Tower. The ELUT may be designed to firmly grip on to the underlying top of pipe at the underside of the upper work station and have some freedom of moving with the top of the pipe. If this solution is followed, it is recommended to let the upper work station follow the same movement.

Lowering Light and Smooth Pipe on Tensioners

A choice may be made for lowering pipe with a top tension less than 600 T on tensioners. The concept may comprise two 2-track tensioners of ~12 m length each to be placed between the middle and lower work station. The tracks may be spring loaded to accommodate incidental variations of the pipe OD like collars, buckle arrestors, etc. and to be suitable for laying pipe with concrete coating.

When a transition is made to pipe with collars, the pipe may be hung off from a hang-off clamp at the level of the middle work station. After hang-off, the tensioner assembly may be opened and moved aside out of the firing line.

In the proposed arrangement of the J-Lay tower with combined firing line it might be preferred that wet coated pipe is lowered on tensioners. With the proposed assembly of the lowering clamp below the lower work station, it may be difficult to fully wet-coat the collars. The top tension of HP/HT wet coated flowlines and SCRs in deep water may exceed the tensioner capacity of 600 T. For this purpose a reserve position for a 3rd tensioner is foreseen above the middle work station. With this 3rd tensioner, the total capacity on tensioners may be increased to 900 T.

Lowering Complicated Pipe and in-Line Structures on Collars

The firing line may be equipped with an assembly of a hang-off clamp and a lowering clamp. Depending on the preferred installation procedure either the set of tensioners or the assembly of clamps may be shifted or retracted into or out of the firing line. This makes it possible to install pipe either on tensioners or on collars and clamps.

The lowering clamp may be separated at least one TJ (pipe section) length from the hang-off clamp. The advantage is illustrated in FIG. 21.

In the Balder collar concept both the hang-off and the lowering clamp engage with the same collar (see FIG. 20). This concept requires thick collars protruding at least 80 mm beyond the OD of the pipe.

In the concept of the J-lay tower with combined firing line, the hang-off and lowering clamp may engage with two different collars. This concept enables to use collars with a rim (providing an engaging location) of 40 mm. The separation of the hang-off and lowering clamp enables thin single-step collars.

Lowering Clamp Below Last Work Station

The lowering clamp may be placed below the last work station.

Single Wire A&R System Above Middle Work Station

For 3500 m water depth, an A&R wire of at least 4000 m length may be required. The location of the A&R sheave allows using the A&R system in combination with the tensioners.

An alternative is to bring the A&R sheave above the ELUT. At that location the A&R system may offer the following additional advantages:

Pull in-line structures brought into the tower between the middle and lower work station (as low in the tower as possible) one TJ distance up to the level where the welds can be laid in the upper and middle work station, Pull out the inner pipe of pipe-in-pipe for pre-tensioning the inner pipe before welding a bulkhead, Taking part of the weight of an in-line structure to relief the weight on the ELUT in the middle work station when welding the in-line structure to the pipe.

Lay Direction Towards the Stern

The lay direction with the tower angle between 90 and 110° allows a straightforward hand-over procedure of the pipe (flex-joint) to the platform.

FIG. 25A-E shows a further embodiment of the vessel according to the invention. The workstations 6 can beside moving in a lateral direction relative to the pipeline 2, move in an axial (vertical) direction. In FIG. 25 three work stations (cabins 1, 2 and 4) move in a loop trajectory. This concept may be used for normal pipelay. The following situations are shown in FIG. 25—

A: Step 1, Move cabin 1 with next pipe section into firing line,

B: Step 2, Weld in cabin 1; weld and inspect in cabin 2; FJC in cabin 3, C: Step 3, Move cabin 2 out of firing line once ready, D: Step 4, Lower pipe with cabin 1 attached and keeping on welding, E: Step 5, Cabin 1 continues welding and inspecting; FJC in cabin 3.

Welding process normally much longer than inspection and coating,

Welding starts in a cabin (1) at an upper joint position,

Once FJC in (3) and inspection in (2) are ready, cabin (2) is moved out of the firing line, The pipe is lowered with the cabin (1) attached to the pipe and keeping on welding, Cabin (4) takes the place of cabin (1) and starts welding on a new joint, In this set-up, cabin (3) is in a fixed position.

FIG. 26A-F shows a further embodiment of the vessel according the invention. This is used for wet coated pipe. The following situations are shown in FIG. 26—

A: Step 1, Move cabin 2 into firing line,

B: Step 2, Stab next pipe section,

C: Step 3, Weld and inspect in cabin 1; FJC in cabins 2 and 3,

D: Step 4, Move cabin 3 out of firing line once ready,

E: Step 5, Lower pipe with cabin 2 attached and keeping on coating,

F: Step 6, Cabin 2 continues coating.

For wet-coated pipe, the coating process is much longer than for welding+inspection, Welding and inspection are done in cabin (1) at a fixed position at the upper joint position, Coating is done in stations (2) and (3), Once welding and inspection in (1) and coating in (3) are ready, cabin (3) is moved out of the firing line, The pipe is lowered with cabin (2) attached to the pipe and keeping on coating, Cabin (4) takes the place of cabin (2) and starts coating on a new joint.

Figure 26:
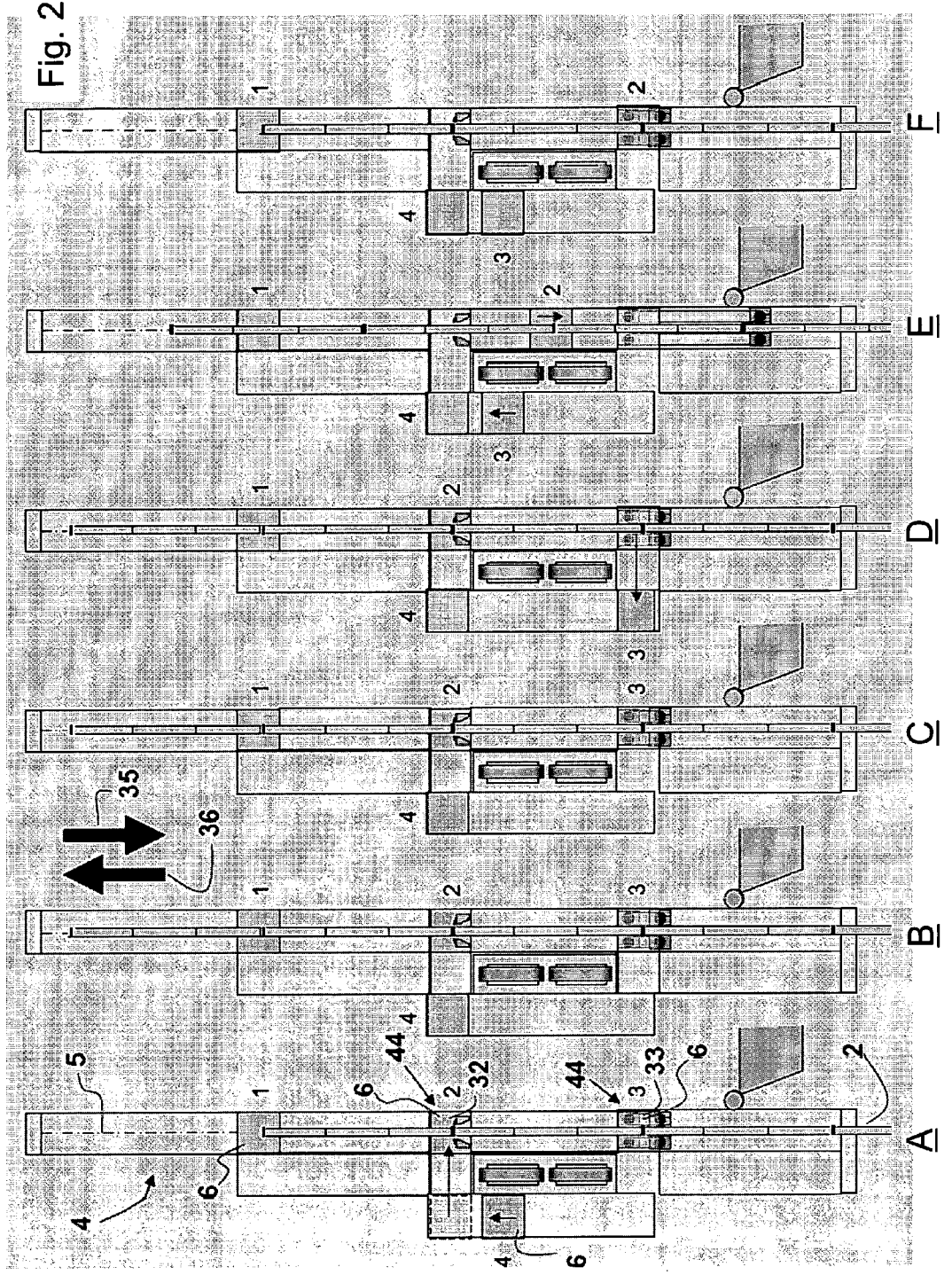
FIG. 26A-F shows a further embodiment of the vessel according the invention.
Figure 27:
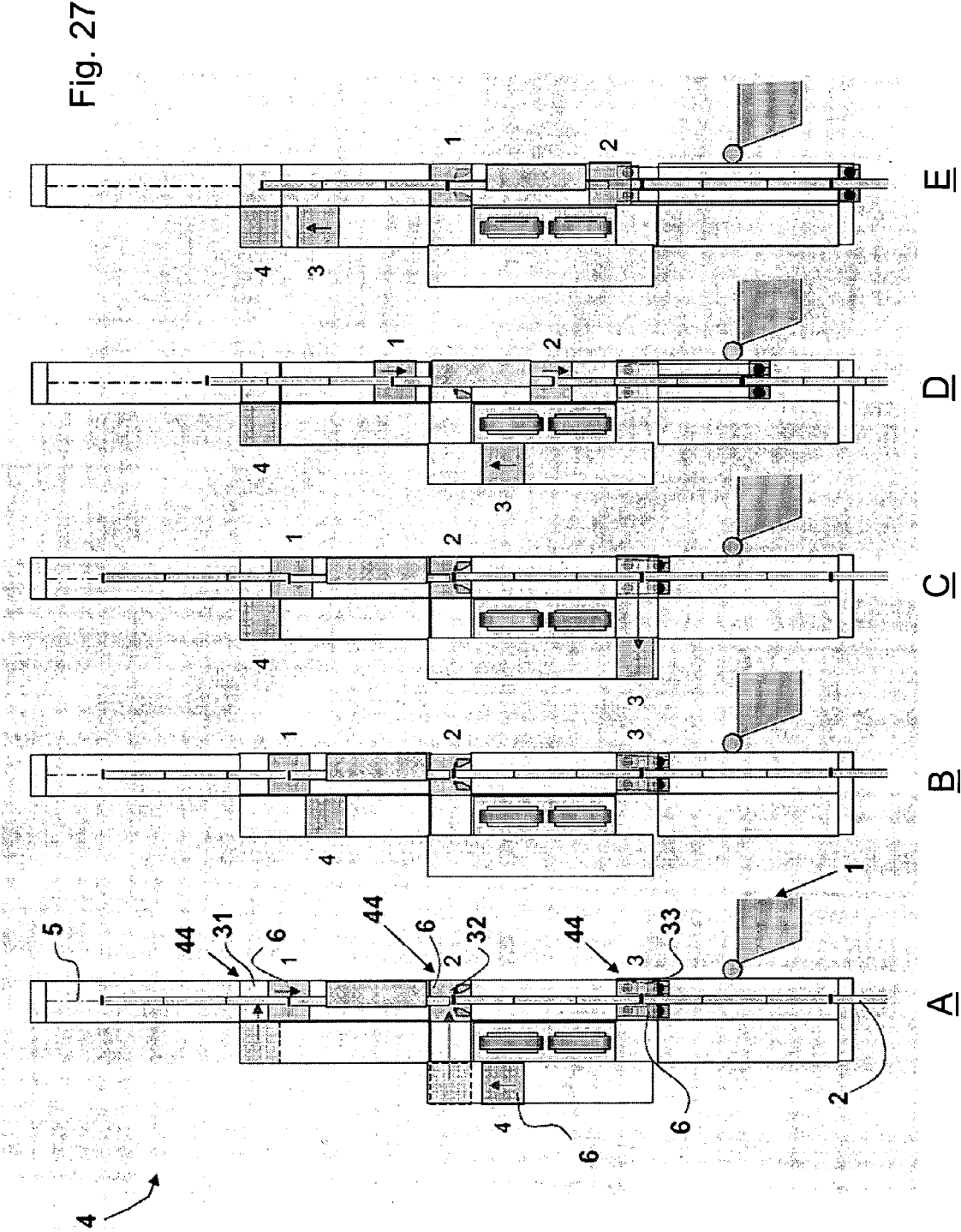
FIG. 27A-E shows a further embodiment of the vessel according the invention.

FIG. 27A-E shows a further embodiment of the vessel according the invention. This is used to install an in-line structure. The following situations are shown in FIG. 26—

A: Step 1, Move cabins 1 and 2 into firing line; stab next pipe section, B: Step 2, Weld and inspect in cabins 1 and 2; FJC in cabin 3, C: Step 3, Move cabin 3 out of firing line once ready, D: Step 4, Lower pipe with cabins 1 and 2 attached and keeping on welding and inspecting, E: Step 5, Cabin 2 continues coating.

For installing an in-line structure (ILS), stations (1) and (2) are brought into the firing line at the ILS upper and lower joint positions, not necessarily at 36.6 m distance.

Once FJC in (3) is ready, cabin (3) is moved out of the firing line,

The pipe is lowered with cabins (1) and (2) attached to the pipe and keeping on welding and inspecting, Cabin (4) takes the place of (1); cabin (3) is moved to the standby position at the upper joint position.

The reference numbers in the figures relate to the following features:

1. Pipeline laying vessel
2. pipeline
3. seabed
4. tower
5. firing line
6. work station
7. pipe section (TJ)
8. tensioners
9. fixating means
10. fixating clamp
11. lowering means
12. lowering clamp
13. tensioning position at least one tensioner
14. non-tensioning position at least one tensioner
15. fixating position fixating means
16. non-fixating position fixating means
17. lowering position lowering means
18. non-lowering position lowering means
19. collar
20. J-lay tower
21. upper working station
22. middle working station
23. lower working station
24. upender
25. joint section
26. first configuration
27. second configuration
28. additional tensioners
29. loader
30. engaging locating
31. first work position
32. second work position
33. third work position
35. firing direction
36. opposite of firing direction
37. voluminous item
38. upper position lowering clamp
39. lower position lowering clamp
40. elevator
41. external line up tool
42. tower rollers
43. non-working position work station
44. working position work station
101. V-lay stinger
102. A&R system for load below 600 T
103. A&R system for load above 600 T
104. In-Line Structure (ILS)
105. suspension rail
106. LC upper block
107. sheaves
108. multi wire A&R system—1400 T
109. single wire A&R system—600 T
110. U-shaped travel block
111. movable guide frame
112. LC lower block The invention further relates to a pipeline laying vessel for laying a pipeline on a seabed and comprising:

a tower comprising a firing line along which in use the pipeline is laid and at least one work station for connecting a pipe section to the pipeline.

The tower may comprise at least one tensioner for fixating and lowering the pipeline.

The tower may comprise fixating means for fixating the pipeline, which fixating means comprise a fixating clamp, and lowering means for fixating and lowering the pipeline, which lowering means comprise a lowering clamp.

The at least one tensioner, fixating means and lowering means may be are arranged such that the vessel is able to in use change between a first configuration in which the pipeline is laid using the at least one tensioner and a second configuration in which the pipeline is laid using the fixating means and lowering means.

The fixating and lowering means may be configured to lay a pipeline with a higher mass than the pipeline for which the tensioners are configured to lay.

The tensioners are configured to fixate and lower a mass of lower than 600.000 kg and the fixating and lowering means are configured to fixate and lower a mass of higher than 600.000 kg.

The fixating and lowering means may be configured to fixate and lower a mass of between 600.000-2.000.000 kg.

The tensioners may be displaceable between a tensioning position in which the tensioners are engageable on the pipeline and a non-tensioning position in which the tensioners allow passing of the pipeline past the tensioners.

The tensioners may be displaceable independently from each other.

The tensioners in the non-tensioning position may be located at a greater distance from the firing line than in the tensioning position.

The tensioners in the tensioning position substantially may surround the firing line and in the non-tensioning position may be positioned such that the tensioners do not surround the firing line.

The tensioners may be displaceable such that in the non-tensioning position the tensioners allow passing of a voluminous item, like an in-line structure and/or a PLET and/or a flex joint and/or a VIV strake and/or a buoy and/or the like, past the tensioners.

The tensioners are displaceable in a direction substantially perpendicular to the firing line.

At least part of the tensioners may be substantially displaceable in a specific direction.

All the tensioners may be substantially displaceable in a specific direction.

The tensioners may be displaceable at least approximately 3 m from the firing line.

The tensioners may be displaceable at most approximately 12 m from the firing line.

The fixating means may be displaceable between
a fixating position in which the fixating clamp is engageable on the pipeline and
a non-fixating position in which the fixating means allow passing of the pipeline past the fixating means.

The fixating means in the non-fixating position may be located at a greater distance from the firing line than in the fixating position.

The fixating clamp in the fixating position may substantially surround the firing line and in the non-fixating position may be positioned such that the fixating clamp does not surround the firing line.

The fixating means may be displaceable such that in the non-fixating position the fixating means allow passing of a voluminous item, like an in-line structure and/or a PLET and/or a flex joint and/or a VIV strake and/or the like, past the fixating means.

The fixating means may be displaceable in a direction substantially perpendicular to the firing line.

The fixating means may be displaceable at least approximately 3 m from the firing line.

The fixating means may be displaceable at most approximately 12 m from the firing line.

The lowering means may be displaceable between
a lowering position in which the lowering clamp is engageable on the pipeline and
a non-lowering position in which the lowering means allow passing of the pipeline past lowering means.

The lowering means in the non-lowering position may be located at a greater distance from the firing line than in the lowering position.

The lowering clamp in the lowering position may substantially surround the firing line and in the non-lowering position may be positioned such that the lowering clamp does not surround the firing line.

The lowering means may be displaceable such that in the non-lowering position the lowering means allow passing of a voluminous item, like an in-line structure and/or a PLET and/or a flex joint and/or a VIV strake and/or the like, past the lowering means.

The lowering means may be displaceable in a direction substantially perpendicular to the firing line.

The lowering means may be displaceable at least approximately 3 m from the firing line.

The lowering means may be displaceable at most approximately 12 m from the firing line.

At least one work station may be partly or completely displaceable between a working position in which work can be performed on a pipeline located in the firing line and a non-working position in which the work station allows passing of the pipeline past the work station.

(Part of) At least one work station in the non-working position may be located at a greater distance from the firing line than in the working position.

(Part of) At least one work station in the working position may substantially surround the firing line and in the non-working position may be positioned such that (part of) the workstation does not surround the firing line.

(Part of) At least one work station may be displaceable such that in the non-working position the work station allow passing of a voluminous item, like an in-line structure and/or a PLET and/or a flex joint and/or a VIV strake and/or the like, past the work station.

(Part of) At least one work station may be displaceable in a direction substantially perpendicular to the firing line.

(Part of) At least one work station may be displaceable at least approximately 3 m from the firing line.

(Part of) At least one work station may be displaceable at most approximately 12 m from the firing line.

The tensioners and/or the fixating means and/or the lowering means and/or (part of) at least one work station may be displaceable in substantially the same direction.

The fixating clamp and the lowering clamp may be configured to in use engage on suspension means provided on the pipeline.

The suspension means may comprise a collar.

The tower may be a J-lay tower.

The tower may comprise more than one work stations.

The work stations which may be substantially aligned along the firing line.

The work stations may be located at a distance D1 from each other.

The tower may comprise an upper work station, a middle work station and a lower work station.

The upper work station may be located at a distance D1 from the middle work station.

The lower work station may be located at a distance D1 from the middle work station.

The distance D1 may be substantially equal to the length of the pipe section from which the pipeline is constructed.

The distance D1 may be substantially equal to twice the length of the pipe section from which the pipeline is constructed.

The pipe section may be of a triple joint (TJ) section length.

The distance D1 may be substantially equal to 37 m.

The upper work station may be configured for welding the pipeline, the middle work station may be configured for welding and/or coating the pipeline, and the lower work station may be configured for coating the pipeline.

The lower work station may be configured for adding strakes, anodes and the like as well.

The tower may comprise only two work stations, which work stations are located at a distance D1 from each other.

The tower may comprise 4, 5 or 6 working stations.

The lowering means may be located after the fixating means when viewed in the firing direction of the firing line.

The lowering means may be located at a distance D1 from the fixating means.

The lowering means may be configured to at least lower the pipeline a distance D2.

The distance D1 may be substantially equal to the distance D2.

The distance D2 may be substantially equal to the length of a pipe section from which the pipeline is constructed.

The distance D2 may be substantially equal to 37 m.

For lowering the pipeline, the lowering clamp may be lowered.

The lowering clamp may be substantially lowered over the distance D2.

The lowering clamp may have an upper position and a lower position.

The lowering clamp may be moveable between the upper and lower position.

The distance between the upper and the lower position may substantially equal to D2.

The fixating means may be in the fixating position located in or nearby the middle work station.

The lowering means may be in the lowering position located in or nearby the lower work station.

At least part of the tensioners may be located between the middle work station and the lower work station.

At least part of the tensioners may be located between the upper work station and the lower work station.

The tower may be pivotable relative to the vessel.

The tower may comprise a loader for loading a pipe section.

The loader may be located in the upper region of the tower.

The loader may be located above the upper work station.

The tower may comprise a loader for loading a voluminous item in the tower.

The loader for a voluminous item may be located between the upper and the lower work station.

At least one of the work stations may be displaceable.

The tower may comprise at least one work position and the displaceable work stations may be displaceable in the at least one work position.

The tower may comprise a first work position and a second work position and the at least one displaceable work station may be displaceable between the first and second work position.

The first and second work positions may be located at the distance D1 from each other.

The tower may comprise two or three displaceable work stations which are displaceable between the first and second work position.

The displaceable work stations may be displaceable along a closed loop trajectory.

Part of the closed loop trajectory may extend along the firing line.

The closed loop trajectory may pass along and/or through the work positions.

The displaceable work stations may be displaceable such that said work stations subsequently pass though the work positions.

The displaceable work stations may be displaceable along the firing line.

The displaceable work stations may be displaceable at the outside the firing line.

The displaceable work stations may be displaceable in the firing direction and in the direction opposite to the firing direction.

The closed loop trajectory may comprise a first section extending substantially in the firing direction and a second section extending substantially in the direction opposite to the firing direction.

The tower may comprise a first work position, a second work position and multiple displaceable work station.

The tower may comprise at least one (non-displaceable) work station.

The first work position may be located above the second work position.

The second work position may be located above the (non-displaceable) work station.

The tower may comprise a third work position.

The (non-displaceable) work station may be located above the second work position.

The second work position may be located above the third work position.

The displaceable work stations may be configured to move along with the pipeline when the pipeline is lowered.

The displaceable work stations may be suitable for welding and/or coating (and/or any other operation relating to the laying of a pipeline) on the pipeline while the displaceable work station is moved along with the pipeline.

The work positions may be substantially aligned along the firing line.

The work positions may be located at the distance D1 from each other.

The work positions and the (non-displaceable) work stations may be located at the distance D1 from each other.

The invention further relates to a method of laying a pipeline on a sea bed with a pipeline laying vessel according to the invention.

The method according the invention may comprise the step of:

changing between a first configuration in which the pipeline is laid with the tensioners and a second configuration in which the pipeline is laid with the fixating means and lowering means.

The method according the invention may comprise the step of:

laying the pipeline with the tensioners or with the fixating means and lowering means, fixating the pipeline with the fixating means and changing to laying the pipeline with respectively the fixating means and lowering means or with the tensioners.

The method according the invention may comprise the steps of: changing between:

a first configuration of the tower wherein the fixating means are located in the fixating position, wherein the fixating clamp is configured such that the fixating clamp in use does not engage the pipeline or the fixating means are located in the non-fixating position in which the fixating means allow passing of the pipeline past the fixating means, the lowering means are located in the non-lowering position in which the lowering means allow passing of the pipeline past the lowering means, the tensioners are located in the tensioning position in which the tensioners are engaged on the pipeline, and a second configuration of the tower wherein the fixating means are located in the fixating position in which the fixating clamp is engageable on the pipeline, the lowering means are located in the lowering position in which the lowering clamp is engageable on the pipeline, the tensioners are located in the non-tensioning position in which the tensioners allow passing of the pipeline past the tensioners.

The first configuration may be suitable for laying the pipeline with the tensioners and the second configuration may be suitable for laying the pipeline with the fixating means and lowering means.

During changing between the first and second configuration the pipeline may be fixated with the fixating means.

During the laying of the pipeline with the fixating and lowering means a pipeline with a higher mass may be laid than during the laying of the pipeline with the tensioners.

For the inserting of the voluminous item in the pipeline the fixating and lowering of the pipeline may be taken over from the tensioners by the fixating and lowering means.

After the inserting of the voluminous item the fixating and lowering of the pipeline may be taken over from the tensioners by the fixating and lowering means for the addition of a small number of pipe sections to the pipeline.

After joining the voluminous item to the already laid pipeline, at least one work station may be partly or completely moved out of the firing line to allow the voluminous item to pass the work station location when in the firing line.

During the laying of the pipeline with the tensioners a mass of lower than 600.000 kg may be fixated and lowered by the tensioners and during the laying of the pipeline with the fixating and lowering means a mass of higher than 600.000 kg may be fixated and lowered by the fixating and lowering means.

During the laying of the pipeline with the fixating and lowering means a mass of between the 600.000-2.000.000 kg may be fixated and lowered by the fixating and lowering means.

The fixating clamp and the lowering clamp may be engage on suspension means provided on the pipeline.

The suspension means may comprise a collar.

The method according the invention may comprise the step of:
connecting a voluminous item to the pipeline.

The method according the invention may comprise one, a combination of a number, or all of the steps of:
lowering the voluminous item past the in non-fixating position located fixating means,
lowering the voluminous item past in the non-tensioning position located tensioners,
lowering the voluminous item past in the non-lowering position located lowering means,
lowering the voluminous item past at least one (at least partly) in the non-working position located working station.

The method according the invention comprise the step of: providing a configuration of the tower in which
the fixating means are located in the fixating position, wherein the fixating clamp is configured such that in use the fixating clamp does not engage the pipeline or
the fixating means are located in the non-fixating position,
the lowering means are located in the non-lowering position,
the tensioners are located in the tensioning position in which the tensioners are engageable on the pipeline.

The method according the invention may comprise the step of: providing a configuration of the tower in which the (displaceable) work stations are in the working position.

The method according the invention may comprise one, a combination of a number, or all of the steps of:
placing the fixating means in the fixating position,
fixating the pipeline with the fixating means,
placing a voluminous item on the pipeline,
placing the voluminous item above the fixating means on the pipe,
connecting the voluminous item to the pipeline,
placing the lowering means in the lowering position,
fixating the pipeline with the lowering means,
placing the fixating means in the non-fixating position,
placing the tensioners in the non-tensioning position,
placing at least one working station (at least partly) in the non-working position
lowering the pipeline along the firing line with the lowering means,
lowering the voluminous item past the fixating means,
lowering the voluminous item past the at least one work station
placing (part of) at least one work station in the working position
fixating the pipeline with the fixating means,
placing the lowering means in the non-lowering position,
raising the lowering clamp,
placing the lowering means in the lowering position,
fixing the pipeline with the lowering means,
lowering the pipeline along the firing line with the lowering means,
lowering the voluminous item past the tensioners
placing the tensioners in the tensioning position.

The method according the invention may comprise one, a combination of a number, or all of the steps of:
placing the lowering means in the lowering position,
engaging the pipeline with the lowering clamp,
lowering the pipeline with the lowering means by lowering the lowering clamp,
decoupling the lowering clamp from the pipeline,
placing the lowering means in the non-lowering position,
raising the lowering clamp,
repeating the cycle.

The method according the invention may comprise the step of:
lowering the pipeline with the lowering means over substantially the distance D2.

The method according the invention may comprise the step of:
lowering the lowering clamp substantially over the distance D2.

The method according the invention may comprise the step of:
lowering the lowering clamp relatively to the fixating means from the distance D1 to the distance D1+D2.

The method according the invention may comprise one, a combination of a number, or all of the steps of:
engaging the pipeline with the fixating clamp at a specific engaging location,
subsequently engaging the pipeline with the lowering clamp at said specific engaging location.

The engaging location may be defined by suspension means provided on the pipeline.

The method according the invention may comprise one, a combination of a number, or all of the steps of:
welding at the upper work station,
welding and/or coating at the middle work station,
coating at the lower work station.

The method according the invention may comprise one, a combination of a number, or all of the steps of:
installation of a VIV stake and/or a anode and/or the like at the lower work station.

The welding at the upper station and/or the welding/coating at the middle work station and/or the coating at the lower work station may be performed simultaneously.

The method according the invention may comprise the step of:
displacing at least one of the works stations.

The method according the invention may comprise the step of:
placing the displaceable work stations in the at least one work position.

The method according the invention may comprise the step of:
placing the displaceable work stations in the first work position and the second work position.

The method according the invention may comprise the step of:
displacing the displaceable work stations between the first and second work positions over substantially the distance D1.

The method according the invention may comprise the step of:
displacing three displaceable work stations between the first and second work position.

The method according the invention may comprise the step of:
displacing the displaceable work stations along the closed loop trajectory.

The method according the invention may comprise the step of:
displacing the displaceable work stations along the closed track which passes along and/or through the work positions.

The method according the invention may comprise the step of:
displacing the displaceable work stations such that said work stations subsequently pass through the work positions.

The method according the invention may comprise the step of:
displacing the displaceable work stations along the firing line.

The method according the invention may comprise the step of:
displacing the displaceable work stations outside the firing line.

The method according the invention may comprise the step of:
displacing the displaceable work stations in the firing direction and in the direction opposite to the firing direction.

The method according the invention may comprise the step of:
displacing the displaceable work stations along the closed loop trajectory in the firing direction and in the direction opposite to the firing direction.

The method according the invention may comprise the step of:
displacing displaceable work stations between the first and second work positions.

The method according the invention may comprise the step of:
displacing displaceable work stations between the second and third work position.

The method according the invention may comprise the step of:
displacing the displaceable work stations along with the pipeline when the pipeline is lowered.

The method according the invention may comprise the step of:
working on the pipeline in at least one of the displaceable workstations while said at least one displaceable work station is moved along with the pipeline.

The method according the invention may comprise the step of:
welding and/or coating in at least one displaceable work station while said at least one displaceable work station is moved along with the pipeline.

The method according the invention may comprise the step of:
moving the displaceable work stations over the distance D1.

The invention claimed is:

1. Pipeline laying vessel for laying a pipeline on a seabed and comprising:
   a tower comprising
   a firing line along which in use the pipeline is laid, and
   at least one work station for connecting a pipe section to the pipeline;
   wherein the tower comprises at least one tensioner for fixating and lowering the pipeline;
   wherein the tower comprises fixating means for fixating the pipeline, which fixating means comprise a fixating clamp, and lowering means for fixating and lowering the pipeline, which lowering means comprise a lowering clamp;
   wherein the at least one tensioner, fixating means and lowering means are arranged such that the vessel is changeable between a first configuration for laying the pipeline with the at least one tensioner and a second configuration for laying the pipeline with the fixating means and lowering means;
   wherein the at least one tensioners, fixating means and lowering means are configured such that with the fixating means and the lowering means a pipeline with a higher mass is layable than with the at least one tensioner; and
   wherein the fixating means and the lowering means are configured to engage on suspension means provided on the pipeline.

2. Pipeline laying vessel according to claim 1, wherein at least one tensioner is configured to fixate and lower a mass of lower than 600.000 kg and the fixating means and lowering means are configured to fixate and lower a mass of higher than 600.000 kg.

3. Pipeline laying vessel according to claim 1, wherein the fixating means and lowering means are configured to fixate and lower a mass of between 600.000-2.000.000 kg.

4. Pipeline laying vessel according to claim 1, wherein the at least one tensioner is displaceable between a tensioning position in which the at least one tensioner is engageable on the pipeline and a non-tensioning position in which the at least one tensioner is not engageable on the pipeline and a clearance is provided for the passing of a voluminous item.

5. Pipeline laying vessel according to claim 1, wherein the fixating means is displaceable between a fixating position in which said fixating means is engageable on the pipeline and a non-fixating position in which the fixating means is not engageable on the pipeline and a clearance is provided for the passing of a voluminous item.

6. Pipeline laying vessel according to claim 1, wherein the lowering means is displaceable between a lowering position in which the lowering means is engageable on the pipeline and a non-lowering position in which the lowering means is not engageable on the pipeline and a clearance is provided for the passing of a voluminous item.

7. Pipeline laying vessel according to claim 1, wherein at least one workstation is partly or completely displaceable between a working position in which work is performable from the workstation and a non-working position in which work is not performable from the workstation and a clearance is provided for the passing of a voluminous item.

8. Pipeline laying vessel according to claim 1, wherein said voluminous item is an in-line structure and/or a PLET and/or a flex joint and/or a VIV strake.

9. Pipeline laying vessel according to claim 1, wherein the at least one tensioner is in the non-tensioning position located at a larger distance from the firing line than in the tensioning position.

10. Pipeline laying vessel according to claim 1, wherein the fixating means is in the non-fixating position located at a larger distance from the firing line than in the fixating position.

11. Pipeline laying vessel according to claim 1, wherein the lowering means is in the non-lowering position located at a larger distance from the firing line than in the lowering position.

12. Pipeline laying vessel according claim 1, wherein part of the at least one work station is in the non-working position located at a larger distance from the firing line than in the working position.

13. Pipeline laying vessel according to claim 1, wherein the at least one tensioner in the tensioning position substantially surrounds the firing line and in the non-tensioning position is positioned such that said at least one tensioner does not substantially surround the firing line.

14. Pipeline laying vessel according to claim 1, wherein the fixating means in the fixating position substantially surrounds the firing line and in the non-fixating position is positioned such that said fixating means does not substantially surround the firing line.

15. Pipeline laying vessel according to claim 1, wherein the lowering means in the lowering position substantially surrounds the firing line and in the non-lowering position is positioned such that said lowering means does not substantially surround the firing line.

16. Pipeline laying vessel according to claim 1, wherein part of the at least one work station in the working position substantially surrounds the firing line and in the non-working position is positioned such that part of said work station does not substantially surround the firing line.

17. Pipeline laying vessel according to claim 1, wherein at least one tensioner is displaceable in a direction substantially transverse to the firing line.

18. Pipeline laying vessel according to claim 1, wherein the fixating means is displaceable in a direction substantially transverse to the firing line.

19. Pipeline laying vessel according to claim 1, wherein the lowering means is displaceable in a direction substantially transverse to the firing line.

20. Pipeline laying vessel according to claim 1, wherein part of the at least one work station is displaceable in a direction substantially transverse to the firing line.

21. Pipeline laying vessel according to claim 1, wherein the at least one tensioner is displaceable in a direction substantially perpendicular to the firing line.

22. Pipeline laying vessel according to claim 1, wherein the fixating means is displaceable in a direction substantially perpendicular to the firing line.

23. Pipeline laying vessel according to claim 1, wherein the lowering means is displaceable in a direction substantially perpendicular to the firing line.

24. Pipeline laying vessel according to claim 1, wherein part of the at least one work station is displaceable in a direction substantially perpendicular to the firing line.

25. Pipeline laying vessel according to claim 1, wherein the at least one tensioner is displaceable at least approximately 3 m from the firing line.

26. Pipeline laying vessel according to claim 1, wherein the fixating means is displaceable at least approximately 3 m from the firing line.

27. Pipeline laying vessel according to claim 1, wherein the lowering means is displaceable at least approximately 3 m from the firing line.

28. Pipeline laying vessel according to claim 1, wherein part of the at least one work station is displaceable at least approximately 3 m from the firing line.

29. Pipeline laying vessel according to claim 1, wherein the at least one tensioner and/or fixating means and/or lowering means and/or part of at least one work station are displaceable in substantially the same direction.

30. Pipeline laying vessel according to claim 1, wherein the tower comprises multiple tensioners.

31. Pipeline laying vessel according to claim 1, wherein for displacement of at least part or all of the tensioners between the tensioning position and non-tensioning position, said tensioners are displaceable independently from each other.

32. Pipeline laying vessel according to claim 1, wherein for displacement of at least part or all of the tensioners between the tensioning position and non-tensioning position, said tensioners are substantially displaceable in a specific direction.

33. Pipeline laying vessel according to claim 1, wherein the fixating means and the lowering means are configured to in use engage on suspension means provided on the pipeline.

34. Pipeline laying vessel according to claim 33, wherein the suspension means comprise a collar.

35. Pipeline laying vessel according claim 1, wherein the tower is a J-lay tower.

36. Pipeline laying vessel according to claim 1, wherein the tower comprises more than one work stations.

37. Pipeline laying vessel according to claim 36, wherein the work stations are substantially aligned along the firing line.

38. Pipeline laying vessel according to claim 36, wherein the work stations are located at a distance D1 from each other.

39. Pipeline laying vessel according to claim 1, wherein the tower comprises an upper work station, a middle work station and a lower work station.

40. Pipeline laying vessel according to claim 39, wherein the upper work station is located at a distance D1 from the middle work station.

41. Pipeline laying vessel according to claim 39, wherein the lower work station is located at a distance D1 from the middle work station.

42. Pipeline laying vessel according to claim 39, wherein the distance D1 is substantially equal to the length of the pipe section from which the pipeline is constructed.

43. Pipeline laying vessel according to claim 39, wherein the distance D1 is substantially equal to twice the length of the pipe section from which the pipeline is constructed.

44. Pipeline laying vessel according to claim 39, wherein the pipe section is of a triple joint section length.

45. Pipeline laying vessel according to claim 39, wherein the distance D1 is substantially equal to 37 m.

46. Pipeline laying vessel according to claim 39, wherein the upper work station is configured for welding the pipeline, the middle work station is configured for welding and/or coating the pipeline, and the lower work station is configured for coating the pipeline.

47. Pipeline laying vessel according to claim 39, wherein the lower work station is configured for adding strakes and/or anodes.

48. Pipeline laying vessel according to claim 39, wherein the fixating means are in the fixating position located in or nearby the middle work station.

49. Pipeline laying vessel according to claim 39, wherein at least part of the tensioners are located between the middle work station and the lower work station.

50. Pipeline laying vessel according to claim 39, wherein at least part of the tensioners are located between the upper work station and the lower work station.

51. Pipeline laying vessel according to claim 39, wherein at least one of the work stations is displaceable.

52. Pipeline laying vessel according to claim 1, wherein the tower comprises only two work stations, which work stations are located at a distance D1 from each other.

53. Pipeline laying vessel according to claim 1, wherein the tower comprises 4, 5 or 6 working stations.

54. Pipeline laying vessel according to claim 1, wherein the lowering means are located after the fixating means when viewed in the firing direction of the firing line.

55. Pipeline laying vessel according to claim 1, wherein the lowering means are located at a distance D1 from the fixating means.

56. Pipeline laying vessel according to claim 55, wherein the lowering means are configured to at least lower the pipeline a distance D2.

57. Pipeline laying vessel according to claim 56, wherein the distance D1 is substantially equal to the distance D2.

58. Pipeline laying vessel according to claim 56, wherein the distance D2 is substantially equal to the length of a pipe section from which the pipeline is constructed.

59. Pipeline laying vessel according to claim 56, wherein the distance D2 is substantially equal to 37 m.

60. Pipeline laying vessel according to claim 56, wherein the lowering means is lowerable over substantially the distance D2.

61. Pipeline laying vessel according to claim 1, wherein the lowering means is lowerable for lowering the pipeline.

62. Pipeline laying vessel according to claim 1, wherein the lowering means comprises an upper position and a lower position.

63. Pipeline laying vessel according to claim 62, wherein the lowering means is moveable between the upper and lower position.

64. Pipeline laying vessel according to claim 62, wherein the distance between the upper and the lower position is substantially equal to D2.

65. Pipeline laying vessel according to claim 1, wherein the lowering means are in the lowering position located in or nearby the lower work station.

66. Pipeline laying vessel according to claim 1, wherein the tower is pivotable relative to the vessel.

67. Pipeline laying vessel according to claim 1, wherein the tower comprises a loader for loading a pipe section.

68. Pipeline laying vessel according to claim 67, wherein the loader is located in the upper region of the tower.

69. Pipeline laying vessel according to claim 67, wherein the loader is located above the upper work station.

70. Pipeline laying vessel according to claim 1, wherein the tower comprises a loader for loading a voluminous item in the tower.

71. Pipeline laying vessel according to claim 70, wherein the loader for a voluminous item is located between the upper and the lower work station.

72. Pipeline laying vessel according to claim 1, wherein the tower comprises at least one work position and the displaceable work stations are displaceable in the at least one work position.

73. Pipeline laying vessel according to claim 1, wherein the tower comprises a first work position and a second work position and the at least one displaceable work station is displaceable between the first and second work position.

74. Pipeline laying vessel according to claim 73, wherein the first and second work positions are located at the distance D1 from each other.

75. Pipeline laying vessel according to claim 73, wherein the tower comprises two or three displaceable work stations which are displaceable between the first and second work position.

76. Pipeline laying vessel according to claim 73, wherein the displaceable work stations are displaceable along a closed loop trajectory.

77. Pipeline laying vessel according to claim 76, wherein part of the closed loop trajectory extends along the firing line.

78. Pipeline laying vessel according to claim 76, wherein the closed loop trajectory passes along and/or through the work positions.

79. Pipeline laying vessel according to claim 76, wherein the closed loop trajectory comprises a first section extending substantially in the firing direction and a second section extending substantially in the direction opposite to the firing direction.

80. Pipeline laying vessel according to claim 73, wherein the displaceable work stations are displaceable such that said work stations subsequently pass through the work positions.

81. Pipeline laying vessel according to claim 73, wherein the displaceable work stations are displaceable along the firing line.

82. Pipeline laying vessel according to claim 73, wherein the displaceable work stations are displaceable outside of the firing line.

83. Pipeline laying vessel according to claim 73, wherein the displaceable work stations are displaceable in the firing direction and in the direction opposite to the firing direction.

84. Pipeline laying vessel according to claim 1, wherein the tower comprises a first work position, a second work position and multiple displaceable work station.

85. Pipeline laying vessel according to claim 84, wherein the tower comprises at least one non-displaceable work station.

86. Pipeline laying vessel according to claim 85, wherein the non-displaceable work station is located above the second work position.

87. Pipeline laying vessel according to claim 85, wherein the work positions and the non-displaceable work stations are located at the distance D1 from each other.

88. Pipeline laying vessel according claim 84, wherein the first work position is located above the second work position.

89. Pipeline laying vessel according to claim 84, wherein the second work position is located above the non-displaceable work station.

90. Pipeline laying vessel according to claim 84, wherein the tower comprises a third work position.

91. Pipeline laying vessel according to claim 84, wherein the second work position is located above the third work position.

92. Pipeline laying vessel according to claim 84, wherein the displaceable work stations are configured to move along with the pipeline when the pipeline is lowered.

93. Pipeline laying vessel according to claim 84, wherein the displaceable work stations are suitable for welding and/or coating on the pipeline while the displaceable work station is moved along with the pipeline.

94. Pipeline laying vessel according to claim 84, wherein the work positions are substantially aligned along the firing line.

95. Pipeline laying vessel according to claim 84, wherein the work positions are located at the distance D1 from each other.

96. Pipeline laying vessel according to claim 1, wherein the suspension means comprise a collar.

97. Method for laying a pipeline on a sea bed with a pipeline laying vessel comprising:
utilizing the pipelaying vessel according to claim 1;
wherein the method comprises the step of:
changing between a first configuration in which the pipeline is laid with the at least tensioners and a second configuration in which the pipeline is laid with the fixating means and lowering means;

wherein during the laying of the pipeline with the fixating and lowering means a pipeline with a higher mass is laid than during the laying of the pipeline with the at least one tensioner; and wherein the fixating means and the lowering means engage on suspension means provided on the pipeline.

98. Method according to claim 97, wherein the method comprises the step of:
laying the pipeline with tensioners or with fixating means and lowering means,
fixating the pipeline with the fixating means, and
changing to laying the pipeline with the fixating means and the lowering means or with the tensioners respectively.

99. Method according to claim 97, wherein the method comprises the steps of:
changing between:
a first configuration of the tower wherein
the fixating means is located in the fixating position and does not engage on the pipeline or the fixating means is located in the non-fixating position,
the lowering means is located in the non-lowering position,
the at least one tensioner is located in the tensioning position and engage on the pipeline, and
a second configuration of the tower wherein
the fixating means and the lowering means are located in the fixating position and the fixating means and/or the lowering means engage on the pipeline,
the at least one tensioner is located in the non-tensioning position.

100. Method according to claim 97, wherein in the first configuration the pipeline is laid with the at least one tensioner and in the second configuration the pipeline is laid with the fixating means and lowering means.

101. Method according to claim 97, wherein during a change between the first and second configuration the pipeline is fixated with the fixating means.

102. Method according to claim 97, wherein for the addition of an voluminous item to the pipeline, the fixating and lowering of the pipeline is taken over from the at least one tensioner by the fixating means and lowering means.

103. Method according to claim 97, wherein after the addition of a voluminous item to the pipeline, the fixating and lowering of the pipeline is taken over from the at least one tensioner by the fixating means and lowering means for the addition of a small number of pipe sections to the pipeline.

104. Method according to claim 97, wherein during the laying of the pipeline with the at least one tensioner a mass of lower than 600.000 kg is fixated and lowered by said at least one tensioner and during the laying of the pipeline with the fixating means and lowering means a mass of higher than 600.000 kg is fixated and lowered by said fixating means and lowering means.

105. Method according to claim 97, wherein during the laying of the pipeline with the fixating means and lowering means a mass of between the 600.000-2.000.000 kg is fixated and lowered by said fixating means and lowering means.

106. Method according to claim 97, wherein the suspension means comprise a collar.

107. Method according to claim 97, wherein the method comprises the step of connecting a voluminous item to the pipeline.

108. Method according to claim 107, wherein after the addition of the voluminous item to the pipeline, at least one work station is partly or completely moved out of the firing line to provide a clearance for the voluminous item to pass said work station.

109. Method according to claim 107, wherein the method comprises one, a combination of a number, or all of the steps of:
lowering the voluminous item past a non-fixating position located with fixating means,
lowering the voluminous item past a non-tensioning position located with at least one tensioner,
lowering the voluminous item past a non-lowering position located with lowering means, and
lowering the voluminous item past at least one (at least partly) in the non-working position located working station.

110. Method according to claim 97, wherein the method comprises the step of:
providing a configuration of the tower in which
fixating means is located in the fixating position such that fixating means does not engage on the pipeline or
the fixating means is located in a non-fixating position,
the lowering means is located in a non-lowering position, and
the at least one tensioner is located in a tensioning position and engage on the pipeline.

111. Method according to claim 97, wherein the method comprises the step of providing a configuration of the tower in which the at least one (displaceable) work stations are in the working position.

112. Method according to claim 97, wherein the method comprises one, a combination of a number, or all of the steps of:
placing a fixating means in a fixating position,
fixating the pipeline with the fixating means,
placing a voluminous item on the pipeline,
placing the voluminous item above the fixating means on the pipeline,
connecting the voluminous item to the pipeline,
placing lowering means in a lowering position,
fixating the pipeline with the lowering means,
placing the fixating means in a non-fixating position,
placing at least one tensioner in a non-tensioning position,
placing the at least one working station (at least partly) in a non-working position,
lowering the pipeline along the firing line with the lowering means,
lowering the voluminous item past the fixating means,
lowering the voluminous item past the at least one work station,
placing (part of) the at least one work station in a working position,
fixating the pipeline with the fixating means,
placing the lowering means in a non-lowering position,
raising the lowering means,
placing the lowering means in the lowering position,
fixating the pipeline with the lowering means,
lowering the pipeline along the firing line with the lowering means,
lowering the voluminous item past the at least one tensioner, and
placing the at least one tensioner in a tensioning position.

113. Method according to claim 97, wherein the method comprises one, a combination of a number, or all of the steps of:
placing e lowering means in a lowering position,
engaging the pipeline with the lowering means,
lowering the pipeline with the lowering means by lowering the lowering means,
decoupling the lowering means from the pipeline,
placing the lowering means in a non-lowering position, raising the lowering means, and
repeating the cycle.

114. Method according to claim 113, wherein the method comprises the step of lowering the pipeline with the lowering means over substantially the distance D2.

115. Method according to claim 113, wherein the method comprises the step of lowering the lowering means substantially over the distance D2.

116. Method according to claim 115, wherein the method comprises the step of lowering the lowering means relatively to the fixating means from the distance D1 to the distance D1+D2.

117. Method according to claim 97, wherein the method comprises one, a combination of a number, or all of the steps of:
engaging the pipeline with fixating means at a specific engaging location, and
subsequently engaging the pipeline with lowering means at said specific engaging location.

118. Method according to claim 117, wherein the engaging location is defined by suspension means provided on the pipeline.

119. Method according to claim 97, wherein the method comprises one, a combination of a number, or all of the steps of:
providing the tower with an upper work station, a middle work station and a lower work station,
welding at the upper work station,
welding and/or coating at the middle work station, and
coating at the lower work station.

120. Method according to claim 119, wherein the method comprises one, a combination of a number, or all of the steps of installation of a VIV stake and/or a anode at the lower work station.

121. Method according to claim 119, wherein the welding at the upper station and/or the welding/coating at the middle work station and/or the coating at the lower work station are performed simultaneously.

122. Method according to claim 119, wherein the method comprises the step of displacing at least one of the works stations.

123. Method according to claim 122, wherein the method comprises the step of placing the displaceable work stations in the at least one work position.

124. Method according to claim 123, wherein the method comprises the step of placing the displaceable work stations in a first work position and a second work position.

125. Method according to claim 124, wherein the method comprises the step of displacing the displaceable work stations between the first and second work positions over substantially the distance D1.

126. Method according to claim 124, wherein the method comprises the step of displacing the displaceable work stations along the closed loop trajectory.

127. Method according to claim 124, wherein the method comprises the step of: displacing the displaceable work stations along the closed track which passes along and/or through the work positions.

128. Method according to claim 124, wherein the method comprises the step of displacing the displaceable work stations such that said work stations subsequently pass through the work positions.

129. Method according to claim 124, wherein the method comprises the step of displacing the displaceable work stations along the firing line.

130. Method according to claim 124, wherein the method comprises the step of: displacing the displaceable work stations outside the firing line.

131. Method according to claim 124, wherein the method comprises the step of displacing the displaceable work stations in the firing direction and in the direction opposite to the firing direction.

132. Method according to claim 124, wherein the method comprises the step of displacing the displaceable work stations along the closed loop trajectory in the firing direction and in the direction opposite to the firing direction.

133. Method according to claim 124, wherein the method comprises the step of displacing the displaceable work stations along with the pipeline when the pipeline is lowered.

134. Method according to claim 124, wherein the method comprises the step of working on the pipeline in at least one of the displaceable workstations while said at least one displaceable work station is moved along with the pipeline.

135. Method according to claim 124, wherein the method comprises the step of welding and/or coating in at least one displaceable work station while said at least one displaceable work station is moved along with the pipeline.

136. Method according to claim 124, wherein the method comprises the step of moving the displaceable work stations over the distance D1.

137. Method according to claim 123, wherein the method comprises the step of displacing three displaceable work stations between the first and second work position.

138. Method according to claim 137, wherein the method comprises the step of displacing displaceable work stations between the first and second work positions.

139. Method according to claim 137, wherein the method comprises the step of displacing displaceable work stations between the second and third work position.

* * * * *